(12) United States Patent
Aminaka et al.

(10) Patent No.: US 9,609,528 B2
(45) Date of Patent: Mar. 28, 2017

(54) MOBILE COMMUNICATION SYSTEM, BASE STATION APPARATUS, MOBILE STATION APPARATUS, CONTROL METHOD, AND COMPUTER READABLE MEDIUM

(75) Inventors: Hiroaki Aminaka, Tokyo (JP); Kojiro Hamabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1084 days.

(21) Appl. No.: 13/499,572

(22) PCT Filed: Aug. 6, 2010

(86) PCT No.: PCT/JP2010/004978
§ 371 (c)(1),
(2), (4) Date: Mar. 30, 2012

(87) PCT Pub. No.: WO2011/039926
PCT Pub. Date: Apr. 7, 2011

(65) Prior Publication Data
US 2012/0190358 A1 Jul. 26, 2012

(30) Foreign Application Priority Data

Oct. 1, 2009 (JP) .................................. 2009-229471

(51) Int. Cl.
*H04W 4/00* (2009.01)
*H04W 36/00* (2009.01)
(Continued)

(52) U.S. Cl.
CPC .......... *H04W 24/02* (2013.01); *H04W 84/045* (2013.01); *H04W 92/12* (2013.01); *H04W 92/20* (2013.01)

(58) Field of Classification Search
CPC ...... H04W 24/08; H04W 36/24; H04W 36/83
(Continued)

(56) References Cited

U.S. PATENT DOCUMENTS

| 6,295,452 B1 * | 9/2001 | Choi ..................... H04W 36/12 370/331 |
| 6,725,032 B1 * | 4/2004 | Sheridan ................. H04L 29/06 455/419 |

(Continued)

FOREIGN PATENT DOCUMENTS

| CN | 1822700 A | 8/2006 |
| JP | 2004-180216 A | 6/2004 |

(Continued)

OTHER PUBLICATIONS

Office Action dated Dec. 26, 2013, issued by the Korean Intellectual Property Office in corresponding Korean Application No. 10-2012-7007510.

(Continued)

*Primary Examiner* — Joshua Schwartz
(74) *Attorney, Agent, or Firm* — Sughrue Mion, PLLC

(57) ABSTRACT

A first transmission controller (13) causes a second base station (7) to transmit first configuration information (CFG1) regarding a first cell (11) using a radio channel capable of being received by at least one first base station (1). A second transmission controller (14) selects a base station from among the at least one first base station (1), and transmits second configuration information (CFG2) regarding the first cell (11) to the selected base station from a higher-level network (15) via an access line (16).

27 Claims, 24 Drawing Sheets

(51) Int. Cl.
*H04W 24/02* (2009.01)
*H04W 84/04* (2009.01)
*H04W 92/12* (2009.01)
*H04W 92/20* (2009.01)

(58) Field of Classification Search
USPC .......................................... 455/422, 436–443
See application file for complete search history.

(56) References Cited

U.S. PATENT DOCUMENTS

| | | | |
|---|---|---|---|
| 8,837,423 B2* | 9/2014 | Kim ...................... | H04W 36/02 370/331 |
| 2004/0121743 A1* | 6/2004 | Rudolf et al. ............. | 455/115.1 |
| 2005/0207359 A1* | 9/2005 | Hwang ............. | H04W 36/0055 370/278 |
| 2005/0277416 A1* | 12/2005 | Tolli .................. | H04W 36/0094 455/436 |
| 2006/0040662 A1* | 2/2006 | Kim et al. .................... | 455/434 |
| 2006/0183482 A1* | 8/2006 | Ueda ............................ | 455/439 |
| 2007/0254620 A1 | 11/2007 | Lindqvist et al. | |
| 2007/0287501 A1 | 12/2007 | Hoshina et al. | |
| 2010/0008293 A1* | 1/2010 | Gupta et al. .................. | 370/328 |
| 2010/0044679 A1 | 2/2010 | Buh et al. | |
| 2010/0056215 A1* | 3/2010 | Gorokhov ............. | H04B 7/024 455/561 |

FOREIGN PATENT DOCUMENTS

| | | |
|---|---|---|
| JP | 2006-222845 A | 8/2006 |
| JP | 2008-17382 A | 1/2008 |
| JP | 2009-111566 A | 5/2009 |
| WO | 2009044620 A1 | 4/2009 |
| WO | 2009/093733 A1 | 7/2009 |

OTHER PUBLICATIONS

Office Action dated Jan. 21, 2014, issued by the State Intellectual Property Office of the P.R.C. in corresponding Chinese Application No. 201080044711.9.
Communication dated Jul. 5, 2016, from the European Patent Office in counterpart European application No. 10820052.8.
"3rd Generation Partnership Project; Technical Specification Group Radio Access Networks; Home Node B Radio Frequency (RF) Requirements (FDD) (Release 9)", 3GPP TR 25.967 9.0.0 (May 2009), pp. 1-55.
"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331 V9.0.0 (Sep. 2009), pp. 1-205.
"Study on Enhanced Interference Management Mechanisms for HNB", 3GPP TSG-RAN #65, Aug. 24-28, 2009, Shenzhen, China.
3rd Generation Partnership Project; Technical Specification Group Radio Access Networks; 3G Home NodeB Study item Technical Report (Release 8), 3GPP TR 25.820 V8.2.0, Sep. 2008, pp. 1-40.

* cited by examiner

MOBILE COMMUNICATION SYSTEM, BASE STATION APPARATUS, MOBILE STATION APPARATUS, CONTROL METHOD, AND COMPUTER READABLE MEDIUM

CROSS REFERENCE TO RELATED APPLICATIONS

This application is a National Stage of International Application No. PCT/JP2010/004978 filed on Aug. 6, 2010, which claims priority from Japanese Patent Application No. 2009-229471, filed on Oct. 1, 2009, the contents of all of which are incorporated herein by reference in their entirety.

TECHNICAL FIELD

The present invention relates to a mobile communication system including a home base station, and more specifically, to a configuration of a home base station or a cell formed by the home base station.

BACKGROUND ART

A standardization organization such as 3GPP (Third Generation Partnership Project) has promoting standardization of a small base station that can be installed in a user's house, an office or the like. This small base station is arranged in a house, a small office or the like by a user, and is connected to a core network via an access line which is a fixed line including an ADSL (Asymmetric Digital Subscriber Line), an optical fiber line or the like. Such a small base station is generally called a femto base station, a femtocell base station, or a home base station. Further, the size (coverage area) of a cell formed by the small base station is extremely small compared to those of macrocells. Thus, the cell formed by the small base station is called a femtocell or a home cell, for example. The 3GPP defines such a small base station as a Home Node B (HNB) and a Home evolved Node B (HeNB) and has promoting standardization work. The HNB is a small base station for UTRAN (Universal Mobile Telecommunications System (UMTS) Terrestrial Radio Access Network), and the HeNB is a small base station for LTE (Long term evolution)/E-UTRAN (Evolved UTRAN).

In this specification, the small base station as stated above is referred to as a "home base station", and a cell formed by the home base station is referred to as a "home cell". The home base stations for UTRAN and E-UTRAN studied by 3GPP are referred to as an HNB or an HeNB, or collectively referred to as an H(e)NB according to the name called in 3GPP. Further, the home cell formed by the H(e)NB is referred to as an "H(e)NB cell".

In 3GPP Release 8, the H(e)NB is standardized as the base station managed by the user (see non-patent literature 1). However, it is difficult for the user to appropriately set configurations of the H(e)NB and H(e)NB cell (e.g. a radio frequency, a scrambling code/a physical cell ID, downlink transmission power). Accordingly, it is concerned that inappropriate configuration of the H(e)NB cell causes a problem of an interference between the M(e)NB cell and the H(e)NB cell. The M(e)NB cell is a macrocell generated by the M(e)NB (macro NodeB or macro eNodeB).

In order to suppress the interference between the H(e)NB cell and the M(e)NB cell, it has been considered that the H(e)NB shall have a function for autonomously setting radio parameters (referred to as self configuration, automatic configuration or the like). The radio parameters specify the characteristics of the radio communication, and more specifically, include a radio frequency band, a scrambling code, transmission power of a pilot signal (CPICH: Common Pilot Channel), and a maximum value of uplink transmission power by a mobile station, for example. Further, in order to achieve autonomous self configuration, it has also been considered that the H(e)NB shall have a function of receiving a downlink signal from a nearby macrocell (referred to as Network Listen Mode, Radio Environment Measurement or the like).

Another method that is proposed to suppress interference between the M(e)NB cell and the H(e)NB cell is to transmit configuration information of the H(e)NB cell to the H(e)NB from a control apparatus such as an RNC (Radio Network Controller) managed by a network operator (see non-patent literature 2). The H(e)NB performs setting regarding the H(e)NB cell based on the received configuration information. This method is supposed to be used together with the self configuration stated above. Since the self configuration is supposed to be performed at the time of set-up of the H(e)NB, it may be possible that the setting of the H(e)NB cell cannot appropriately follow subsequent changes in the surrounding environment. Accordingly, when the H(e)NB cell is not appropriately set, it is required to prompt reconfiguration of the H(e)NB cell by supplying the configuration information to the H(e)NB from a higher-level network.

Proposed as a method to supply the configuration information to the H(e)NB is (1) transmitting from the M(e)NB by a radio channel (e.g. broadcast channel). Another method that is proposed to supply the configuration information is (2) transmitting from a higher-level network connected to the H(e)NB via an access line. The higher-level network includes a core network, an H(e)NB gateway (H(e)NB-GW), and an IP network that connects between the H(e)NB and the H(e)NB. Although the transmission path that passes through the higher-level network is typically a wired path, a radio path (wireless LAN or the like) may be used at least for a part (especially for a user's home network) of the transmission path.

CITATION LIST

Non Patent Literature

NPTL 1: 3GPP TR 25.820 v8.2.0 (2008-09), "3G Home Node B (HNB) study item Technical Report"

NPTL 2: 3GPP contributed article, R3-091894 "Study on Enhanced Interference Management Mechanisms for HNB", [online], 3GPP, [searched on Sep. 19, 2009], the Internet <URL: http://www.3gpp.org/ftp/tsg_ran/WG3_Iu/TSGR3_65/Docs/R3-091894.zip>

SUMMARY OF INVENTION

Technical Problem

If configuration information is transmitted to all the H(e)NBs connected to the core network via the access line, reachability of configuration information to the H(e)NB may be improved compared to a case in which radio transmission is performed from the M(e)NB. This is because the H(e)NB located in a place incapable of receiving a downlink signal from the M(e)NB cannot receive the configuration information radio-transmitted from the M(e)NB. However, when the configuration information is transmitted to all the H(e)NBs via the access lines, a load of the access lines may become large. Accordingly, it is desirable to suppress an excessive increase in the load of the access lines by appropriately combining the radio transmission from the M(e)NB and the transmission via the access line.

The present invention has been made based on the aforementioned discussion by the inventors. Specifically, the present invention aims to provide a mobile communication system, a base station apparatus, a mobile station apparatus, a control method, and a program that are able to contribute both of reachability of configuration information to a home base station and suppression of a load of an access line when configuration information is supplied to a home base station such as an H(e)NB.

Solution to Problem

In a first illustrative aspect of the present invention, a mobile communication system includes at least one first base station, a second base station, a first transmission control unit, and a second transmission control unit. Each of the at least one first base station is connected to a higher-level network via an access line, and forms a first cell. The second base station is connected to the higher-level network, and forms a second cell. The first transmission control unit causes the second base station to transmit first configuration information regarding the first cell using a radio channel capable of being received by the at least one first base station. The second transmission control unit selects a base station from the at least one first base station, and transmits second configuration information regarding the first cell to the selected base station via the access line from the higher-level network.

In a second illustrative aspect of the present invention, a base station apparatus includes a radio communication unit, a higher-level network communication unit, and a configuration control unit. The radio communication unit forms a first cell and performs radio communication with a mobile station, and is capable of receiving a radio signal from a second cell formed by another base station. The higher-level network communication unit is capable of performing communication with a higher-level network via an access line. The configuration control unit is capable of acquiring configuration information regarding the first cell by both of a first path and a second path, and sets the first cell based on the configuration information.

In a third illustrative aspect of the present invention, a mobile station apparatus includes a radio communication unit and a control unit. The radio communication unit is capable of performing radio communication with a base station. The control unit transmits, in response to reception of a measurement request including identification information to specify a measurement target cell different from a cell formed by the base station via the radio communication unit, a measurement result of a radio signal from the measurement target cell to a higher-level network via the radio communication unit.

In a fourth illustrative aspect according to the present invention, a method of supplying configuration information to at least one first base station each forming a first cell is provided. This method includes:
(a) causing a second base station forming a second cell to transmit first configuration information regarding the first cell using a radio channel capable of being received by the at least one first base station;
(b) selecting a base station from the at least one first base station; and
(c) transmitting second configuration information regarding the first cell to the selected base station via an access line connecting between a higher-level network and the selected base station.

In a fifth illustrative aspect according to the present invention, a method of controlling a base station connected to a higher-level network via an access line is provided. This method includes:
(a) acquiring first configuration information carried by a radio signal arriving from a cell formed by another base station;
(b) acquiring second configuration information arriving via the higher-level network and the access line; and
(c) setting the first cell based on the first or second configuration information.

In a sixth illustrative aspect according to the present invention, a method of controlling a mobile station capable of performing radio communication with a base station is provided. This method includes:
(a) receiving, from the base station via radio, a measurement request including identification information for specifying a measurement target cell different from a cell formed by the base station; and
(b) transmitting a measurement result of a radio signal from the measurement target cell to the base station via radio in response to the measurement request.

In a seventh illustrative aspect according to the present invention, a program for causing a computer to perform control regarding a base station connected to a higher-level network via an access line is provided. The control performed by the computer based on the program includes:
(a) acquiring first configuration information carried by a radio signal arriving from a cell formed by another base station;
(b) acquiring second configuration information arriving via the higher-level network and the access line; and
(c) setting the first cell based on the first or second configuration information.

In an eighth illustrative aspect according to the present invention, a program for causing a computer to perform control regarding a mobile station capable of performing radio communication with a base station is provided. The control performed by the computer based on the program includes:
(a) acquiring, from reception data arriving from the base station via radio, a measurement request including identification information for specifying a measurement target cell different from a cell formed by the base station; and
(b) generating transmission data to the base station in response to the measurement request, the transmission data including a measurement result of a radio signal from the measurement target cell.

Advantageous Effects of Invention

According to each illustrative aspect of the present invention stated above, it is possible to provide a mobile communication system, a base station apparatus, a mobile station apparatus, a control method, and a program that are able to contribute both of reachability of configuration information to a home base station and suppression of a load of an access line when configuration information is supplied to a home base station such as an H(e)NB.

DESCRIPTION OF EMBODIMENTS

In the following description, specific illustrative embodiments of the present invention will be described in detail with reference to the drawings. Throughout the drawings, the same components are denoted by the same reference symbols, and overlapping description will be omitted as appropriate for the sake of clarification of description.

First Illustrative Embodiment

Figure 1:
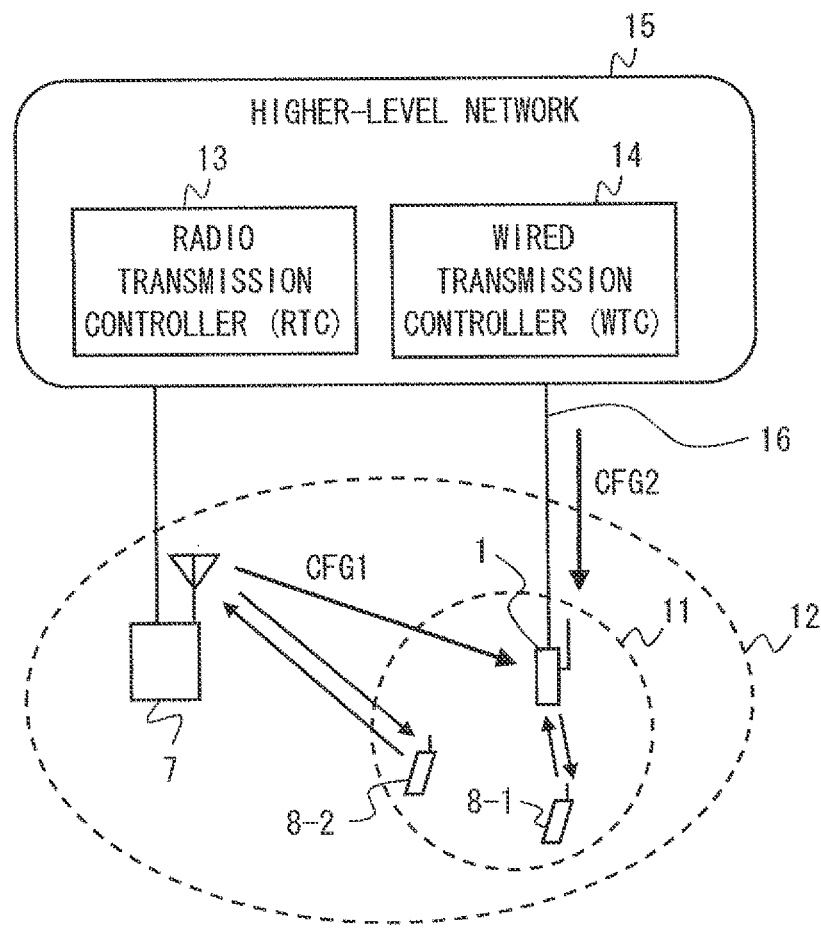
FIG. 1 is a diagram showing a network configuration example of a mobile communication system according to a first illustrative embodiment of the present invention.

FIG. 1 is a diagram showing a network configuration example of a mobile communication system according to a first illustrative embodiment of the present invention. While only one home base station 1 is shown in FIG. 1 to simplify the explanation, plural home base stations are typically arranged in a macrocell 12. Further, each of a mobile station 8-1 connected to a home cell 11 and a mobile station 8-2 connected to the macrocell 12 is also generally arranged in plural number.

The home base station 1 performs bi-directional radio communication with the mobile station 8-1. Further, the home base station 1 is connected to a higher-level network 15 including a core network of a network operator (mobile network operator) via an access line 16, and relays traffic between the mobile station 8-1 and the higher-level network 15. The home cell 11 is a cell formed by the home base station 1.

A macro base station 7 forms the macrocell 12 whose cell size is larger than that of the home cell 11, and performs bi-directional radio communication with the mobile station 8-2. The macro base station 7 is connected to the higher-level network 15, and relays traffic between the mobile station 8-2 and the higher-level network 15.

A radio transmission controller 13 and a wired transmission controller 14 arranged in the higher-level network 15 supply configuration information (CFG1 and CFG2) of the home base station 1 to the home base station 1. The configuration information (CFG1 and CFG2) includes information that is required to set the home cell 11. The configuration information (CFG1 and CFG2) includes designation of radio parameter(s) that specifies the characteristics of the home cell 11. At least one of a radio resource (a radio frequency, a scrambling code or the like) of the home cell 11, and transmission power of a downlink signal is specified.

The radio transmission controller 13 supplies the configuration information (CFG1) to the home base station 1 by a radio communication path via the macro base station 7. In summary, the configuration information (CFG1) is transmitted to the macrocell 12 using a downlink radio channel from the macro base station 7. A common control channel (e.g. broadcast channel) capable of being received by the plural home base stations 1 is preferably used so as to allow the plurality of home base stations 1 arranged in the macrocell 12 to receive the configuration information (CFG1).

On the other hand, the wired transmission controller 14 transmits the configuration information (CFG2) to the home base station 1 via the access line 16 connecting the home base station 1 to the higher-level network 15. The access line 16 includes an access line including a user's home LAN, ADSL, or an optical fiber line, an IP network including an internet service provider (ISP) or the like. Typically, the access line 16 is a wired line and network. However, at least a part of the access line 16 may be a wireless line and network. While the term "wired" transmission controller 14 is used in order to clearly differentiate it from the "radio" transmission controller 13 using the downlink radio channel transmitted from the macro base station 7, not the whole transmission path of the configuration information (CFG2) from the wired transmission controller 14 to the home base station 1 is required to be a wired line and network.

Further, the wired transmission controller 14 does not unconditionally transmit the configuration information (CFG2) to all the home base stations 1. The wired transmission controller 14 selects a suspicious base station which is suspected that it is not appropriately set by the configuration information (CFG1) transmitted via the downlink radio channel of the macro base station 7 from among the plurality of home base stations 1. Then, the wired transmission controller 14 selectively transmits the configuration information (CFG2) to the suspicious base station.

The two configuration information CFG1 and CFG2 may be the same contents or not. When the CFG1 is different from the CFG2, the configuration information (CFG1) may be the setting contents common to the plurality of home base stations 1 arranged in the macrocell 12, for example, whereas the configuration information (CFG2) may be particular setting contents corresponding to the suspicious base station.

Figure 2:
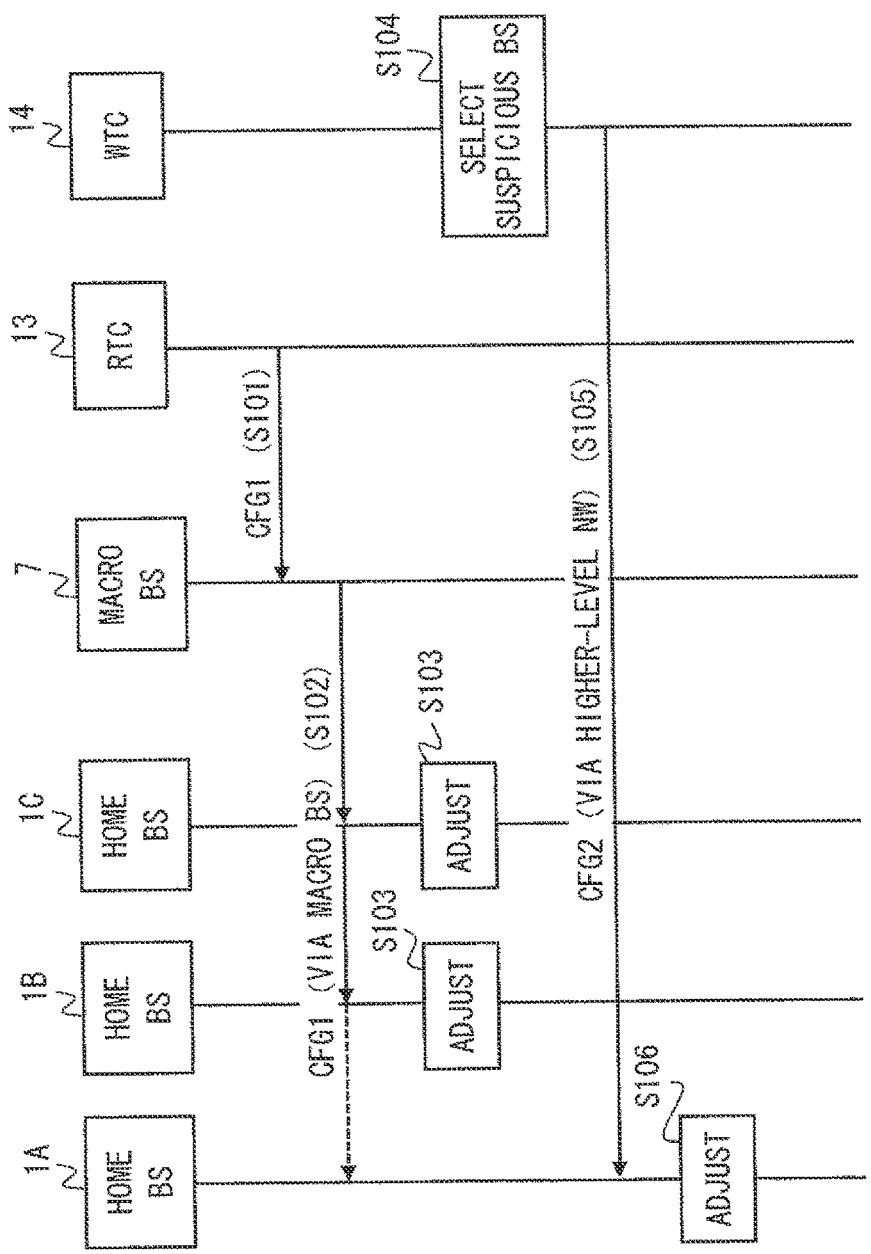
FIG. 2 is a sequence diagram showing procedures for supplying configuration information in the mobile communication system according to the first illustrative embodiment of the present invention.

FIG. 2 is a sequence diagram showing a specific example of procedures for supplying configuration information to the home base stations 1. FIG. 2 assumes a case in which three home base stations 1 (1A-1C) are arranged in the macrocell 12 or near the macrocell 12. Further, in FIG. 2, the home base stations 1B and 1C are assumed to be arranged in positions capable of receiving the downlink radio channel transmitted from the macro base station 7. On the other hand, it is assumed that the home base station 1A is arranged in a position that is difficult to receive the downlink radio channel transmitted from the macro base station 7.

In step S101 of FIG. 2, the configuration information (CFG1) is transmitted from the radio transmission controller (RTC) 13 to the macro base station 7. In step S102, the macro base station 7 transmits the configuration information (CFG1) using the downlink radio channel capable of being received by the home base stations 1A-1C. In step S103, the home base stations 1B and 1C adjust its own home cells according to the configuration information (CFG1) received from the macro base station 7. On the other hand, since the home base station 1A cannot receive the downlink radio channel transmitted from the macro base station 7, it does not perform adjustment of the cell configuration here.

In step S104, the wired transmission controller (WTC) 14 selects the suspicious base station which is suspected that it is not appropriately set by the configuration information (CFG1). In this example, the home base station 1A is selected as the suspicious base station. In step S105, the wired transmission controller (WTC) 14 transmits the configuration information (CFG2) to the home base station 1A selected as the suspicious base station from the higher-level network 15 via the access line 16. Lastly, in step S106, the home base station 1A adjusts its own home cell according to the configuration information (CFG2) received from the higher-level network 15 via the access line 16.

As described above, according to the first illustrative embodiment, the radio transmission controller 13 and the macro base station 7 radio-transmit the configuration information (CFG1) using a radio channel capable of being received by the home base stations 1 arranged in the macrocell 12. Further, the wired transmission controller 14 selects the home base station 1 (suspicious base station) which is suspected that it is not appropriately set, and transmits the configuration information (CFG2) to the suspicious base station via the higher-level network 15. In summary, according to the first illustrative embodiment, the radio transmission of the configuration information (CFG1) via the macro base station 7 is basically performed, and the configuration information (CFG2) is selectively transmitted, from the higher-level network 15 via the access line 16, to the suspicious base station which is suspected that it is not appropriately set by the configuration information (CFG1). Accordingly, it is possible to achieve both of reachability of the configuration information to the home base station 1 and suppression of a load of the higher-level network 15.

Figure 3:
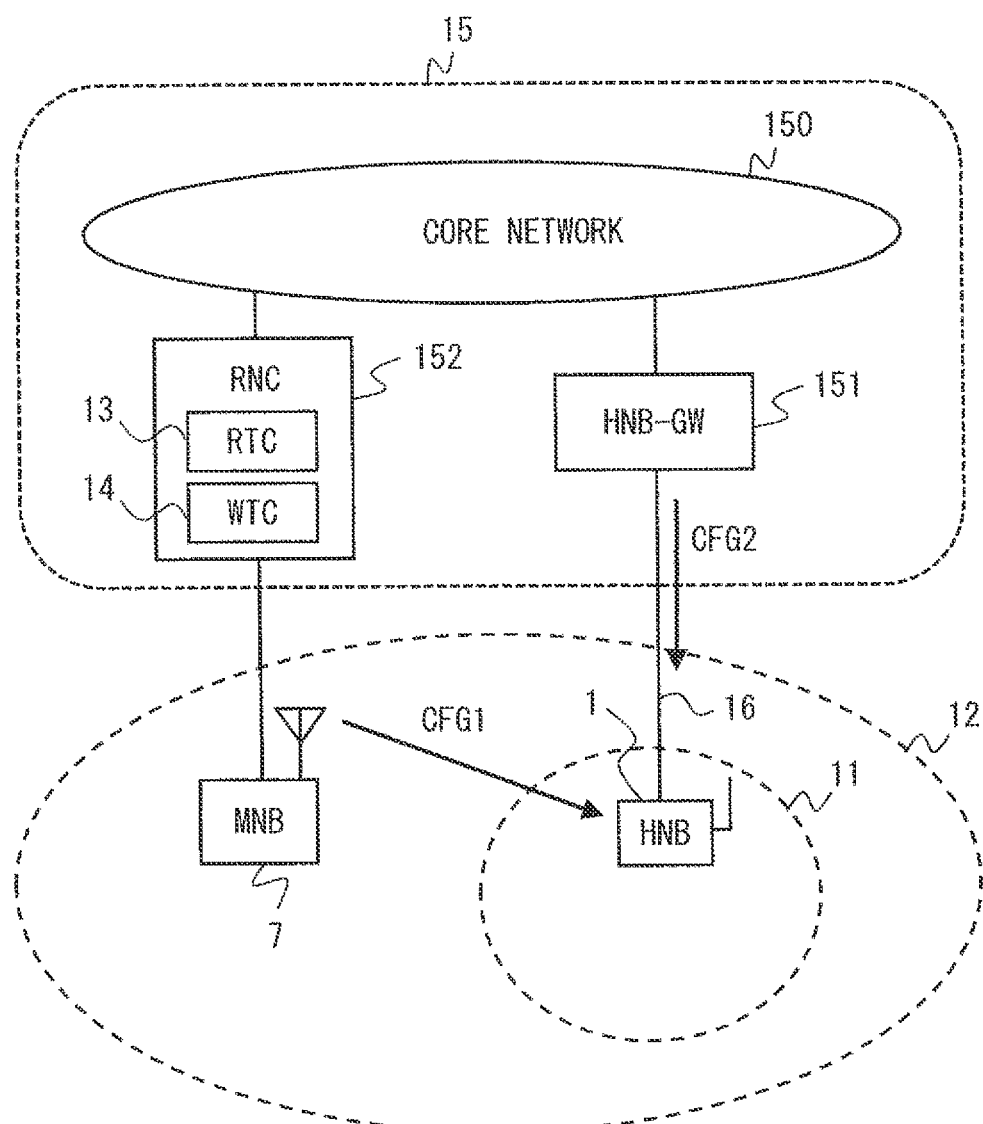
FIG. 3 is a diagram showing a network configuration example (a case of UTRAN) of the mobile communication system according to the first illustrative embodiment of the present invention.

Incidentally, the arrangement of the radio transmission controller 13 and the wired transmission controller 14 is determined as appropriate based on the design concept of the network architecture. For example, when the mobile communication system according to the first illustrative embodiment is UMTS, as shown in FIG. 3, the functions of the radio transmission controller 13 and the wired transmission controller 14 may be arranged in an RNC 152. FIG. 3 is a diagram showing a configuration example when the mobile communication system according to the first illustrative embodiment is applied to UMTS. In the example shown in FIG. 3, the higher-level network 15 includes a core network 150, an HNB-GW 151, and the RNC 152. The HNB-GW 151 is arranged between the core network 150 and the home base station (HNB) 1, and relays user data and control data including the CFG2 between the core network 150 and the HNB 1. The RNC 152 is arranged between the core network 150 and the macro base station 7, and relays the user data and the control data between them. Further, the RNC 152 performs radio resource management of the macrocell 12, and control of an inter-cell movement of the mobile station 8-2 which exits in the macrocell 12.

Figure 4:
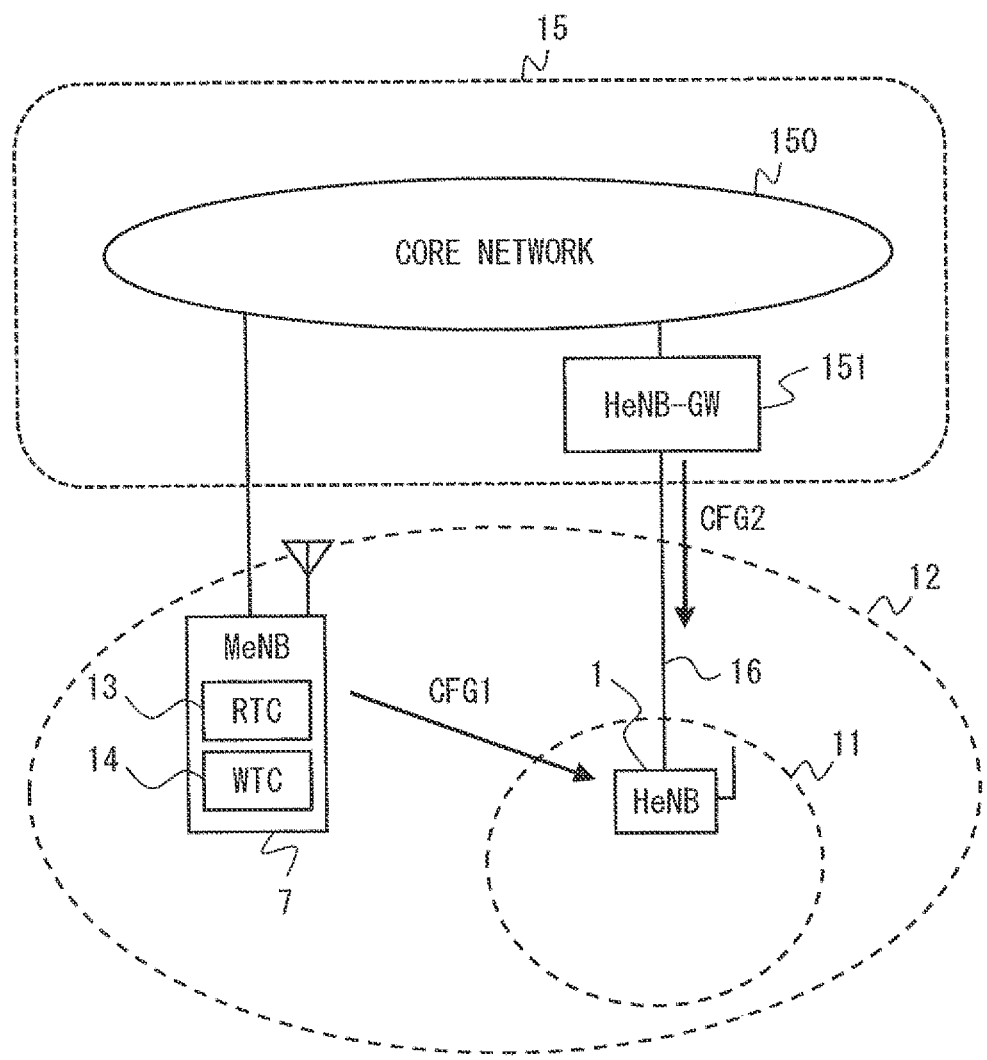
FIG. 4 is a diagram showing a network configuration example (a case of LTE/E-UTRAN) of the mobile communication system according to the first illustrative embodiment of the present invention.

When the mobile communication system according to the first illustrative embodiment is an EPS (Evolved Packet System), as shown in FIG. 4, the functions of the radio transmission controller 13 and the wired transmission controller 14 may be arranged in the macro base station (macro eNB(MeNB)) 7. FIG. 4 is a diagram showing a configuration example of the mobile communication system according to the first illustrative embodiment when this system is applied to the EPS.

Figure 5:
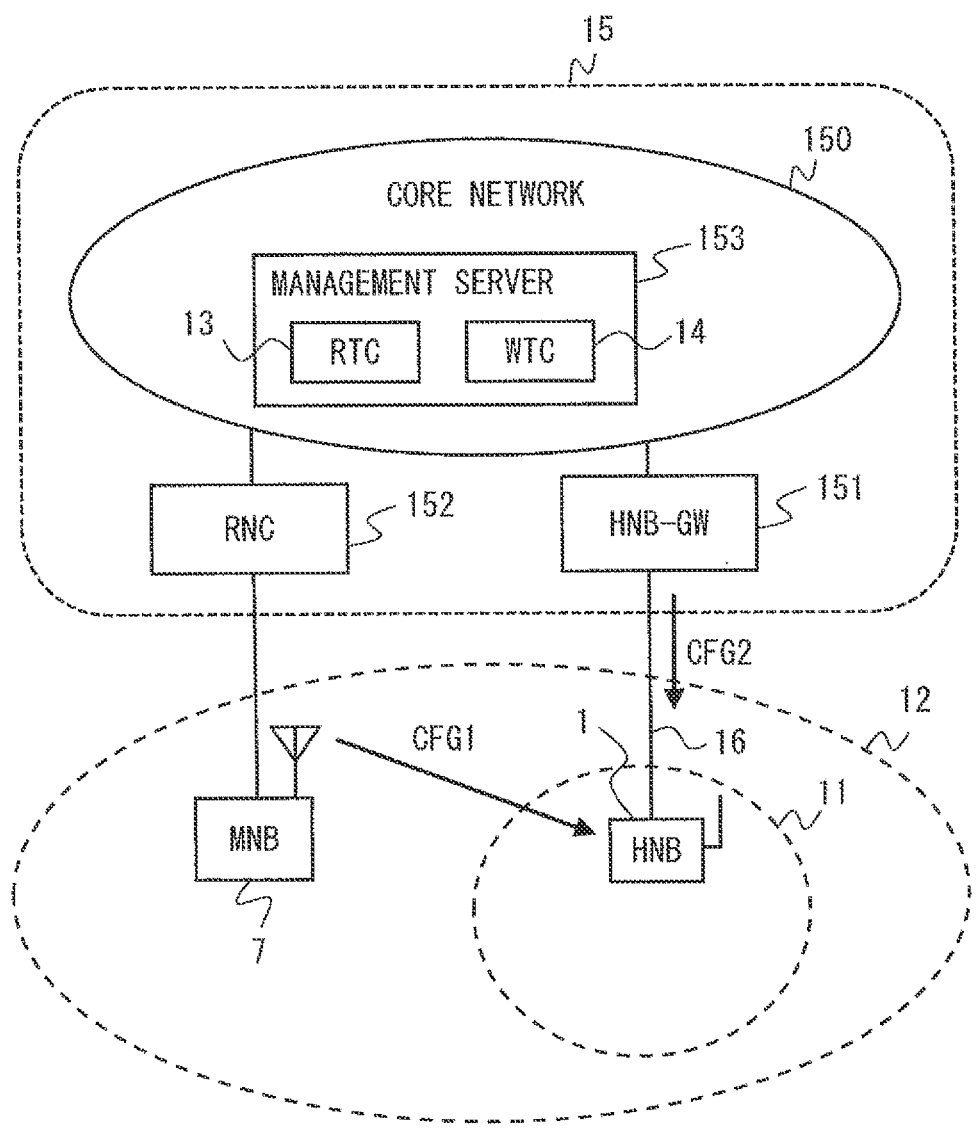
FIG. 5 is a diagram showing a network configuration example (a case of UTRAN) of the mobile communication system according to the first illustrative embodiment of the present invention.

Further, as shown in FIG. 5, the functions of the radio transmission controller 13 and the wired transmission controller 14 may be arranged in a management server 153 in the core network 150. While FIG. 5 shows a case of the UMTS, the same is applied to other mobile communication systems including the EPS as well.

Further, the function of the radio transmission controller 13 and that of the wired transmission controller 14 may be separately arranged. For example, in the example shown in FIG. 3, the radio transmission controller 13 may be arranged in the RNC 152 and the wired transmission controller 14 may be arranged in the core network 150.

Described in the first illustrative embodiment is the case in which the wired transmission controller 14 selects the suspicious base station. There are various specific examples for selecting the suspicious base station by the wired transmission controller 14. For example, the wired transmission controller 14 may determine the suspicious base station by referring to information indicating the attributes of the home base station 1. In this case, the management server that manages the home base station 1 may be arranged in the higher-level network 15, and the management server may collect and manage the attribute information of the home base station 1.

As the attributes of the home base station 1, information of the location where the home base station 1 is arranged, information indicating reception quality of the radio signal from the macrocell 12 in the position where the home base station 1 is arranged, or information indicating an interference level from the macrocell 12 may be used. This is because, for example, when the reception quality of the radio signal from the macrocell 12 is low, the configuration information (CFG1) via the radio path may not be normally received, which means there is high possibility that the supply of the configuration information (CFG2) via the higher-level network 15 is required. Further, when the interference level from the macrocell 12 is large, the configuration information (CFG1) that is common to all the home base stations 1 may not be the appropriate setting, which means there is high possibility that particular setting by the configuration information (CFG2) is required.

Further, the wired transmission controller 14 may receive the measurement result of the reception quality of the downlink radio signal from the macrocell 12 from each home base station 1, and select the base station whose reception quality is below a predetermined level as the suspicious base station.

Further, the wired transmission controller 14 may determine the suspicious base station depending on whether the transmission request from the home base station 1 is received. In short, when the transmission request of the configuration information (CFG2) is received from the home base station 1, the base station that has transmitted the request may be selected as the suspicious base station.

Further, the wired transmission controller 14 may determine the suspicious base station using the result that the mobile station 8-2 connected to the macrocell 12 measured the home cell 11. Specifically, when the interference in the mobile station 8-2 (interference from the downlink signal of the home cell 11 to the downlink signal of the macrocell 12) is larger than a predetermined level, the home base station 1 forming the home cell 11 may be selected as the suspicious base station. This is because it is required to transmit the particular configuration information (CFG2) to such home base station 1 in order to decrease the interference.

Specific examples for determining the suspicious base station including some examples described above will be described in detail in the second to sixth illustrative embodiments of the present invention.

Second Illustrative Embodiment

Figure 6:
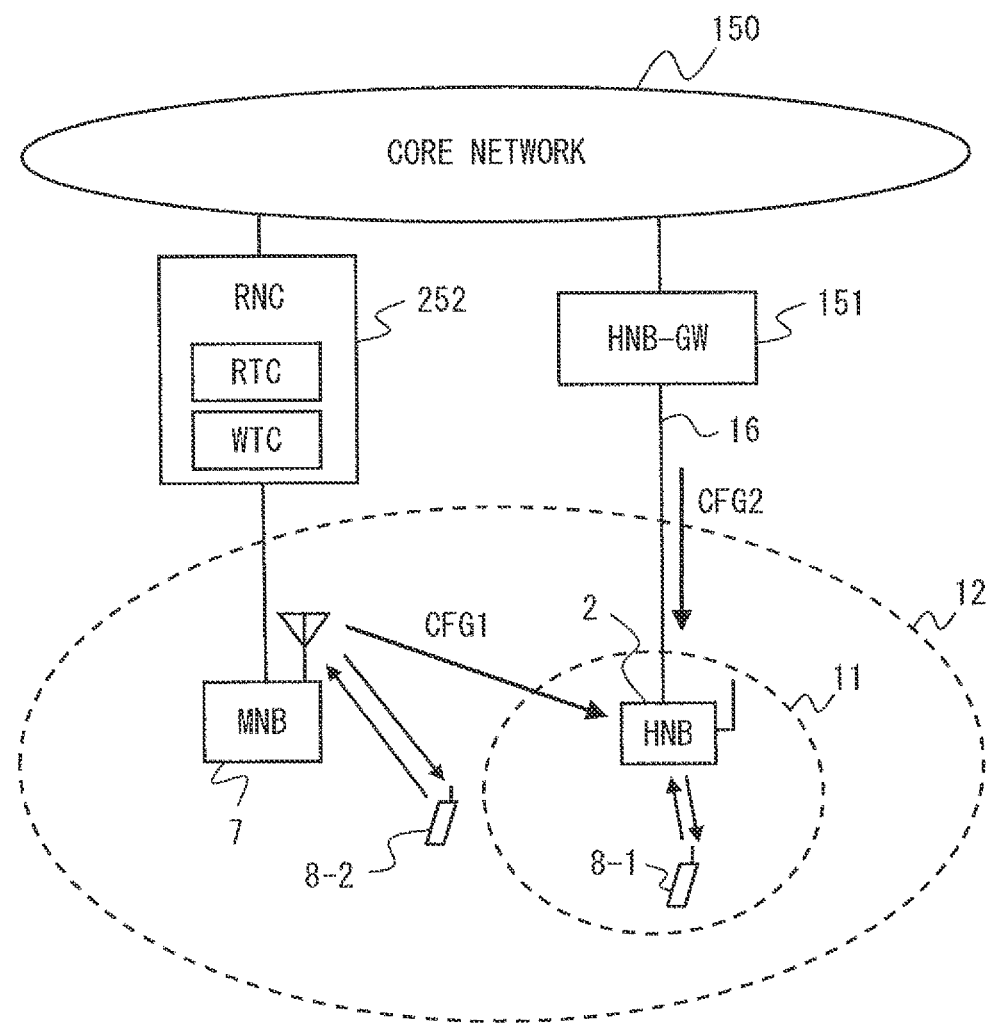
FIG. 6 is a diagram showing a network configuration example (a case of UTRAN) of a mobile communication system according to a second illustrative embodiment of the present invention.

FIG. 6 shows a configuration example of a mobile communication system according to a second illustrative embodiment. Described in the second illustrative embodiment is a case of UMTS/UTRAN. Naturally, the second illustrative embodiment may be applied to other systems including an EPS (Evolved Packet System)/E-UTRAN.

In the second illustrative embodiment, an RNC 252 causes the macro base station (MNB) 7 to radio-transmit the configuration information (CFG1). Further, when it is determined that a home base station (HNB) 2 is the suspicious base station, the RNC 252 transmits the configuration information (CFG2) to the HNB 2 from the core network 150 and the HNB-GW 151 via the access line 16. Further, the RNC 252 determines the suspicious base station by referring to the registration information indicating the attributes of the HNB 2.

Figure 7:
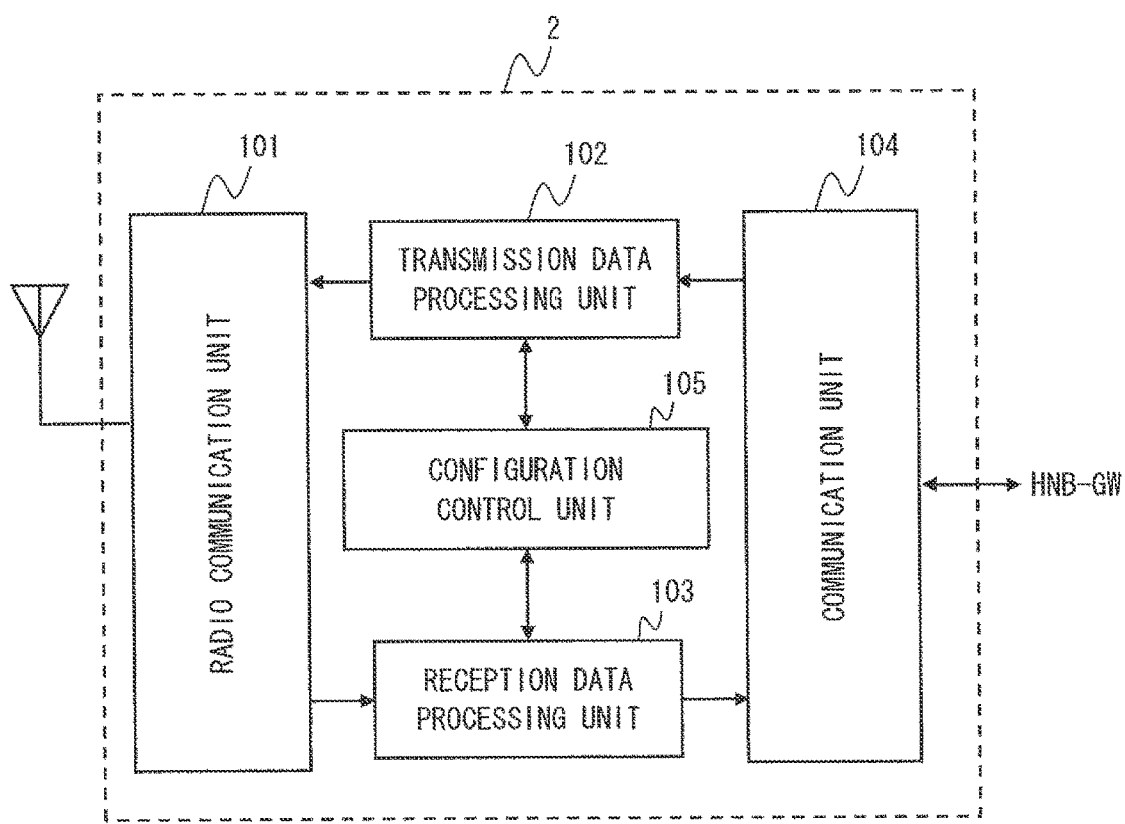
FIG. 7 is a block diagram showing a configuration example of a home base station according to the second illustrative embodiment of the present invention.

Configuration examples of the HNB 2 and the RNC 252 will be described hereinafter with reference to FIGS. 7 and 8. FIG. 7 is a block diagram showing an example of the configuration of the HNB 2. In FIG. 7, a radio communication unit 101 performs each processing including quadrature modulation, frequency conversion, and signal amplification on a transmission symbol sequence supplied from a transmission data processing unit 102 to generate a downlink signal, and transmits the downlink signal to the mobile station 8-2. Further, the radio communication unit 101 receives an uplink signal transmitted from the mobile station 8-2.

Further, the radio communication unit 101 includes a function (Network Listen Mode) of receiving the downlink signal from a nearby base station such as the MNB 7. The radio communication unit 101 is configured to receive the downlink signal transmitted from the MNB 7 and to perform measurement of the reception quality.

The transmission data processing unit 102 acquires from a communication unit 104 the transmission data transmitted to the mobile station 8-2, performs error correction coding, rate matching, interleaving or the like to generate a transport channel. Further, the transmission data processing unit 102 adds control information including a TPC (Transmit Power Control) bit or the like to data sequence of the transport channel to generate a radio frame. Further, the transmission data processing unit 102 performs spreading processing and symbol mapping to generate a transmission symbol sequence.

Further, upon receiving the configuration information (CFG2) from the core network 150, the transmission data processing unit 102 transfers the CFG2 to a configuration control unit 105.

A reception data processing unit 103 performs each processing including de-spreading, RAKE synthesis, de-interleaving, channel decoding, and error correction of the uplink signal received by the radio communication unit 101 to restore the reception data. The resulting reception data is transferred to the HNB-GW 151 and the core network 150 via the communication unit 104.

Further, when the operation mode of the radio communication unit 101 is a mode (Network Listen Mode) to receive the downlink signal from the nearby base station, the reception data processing unit 103 acquires the cell configuration information (CFG1) from the reception data.

A configuration control unit 105 performs configuration of the home cell (HNB cell) 11 according to the configuration information (CFG1) received from the reception data processing unit 103 or the configuration information (CFG2) received from the transmission data processing unit 102. The configuration control unit 105 may transmit the measurement result of the reception quality of the macrocell (MNB cell) 12 to the core network 150 via the communication unit 104. Further, the configuration control unit 105 may transmit the transmission request of the configuration information (CFG2) to the core network 150 via the communication unit 104.

Figure 8:
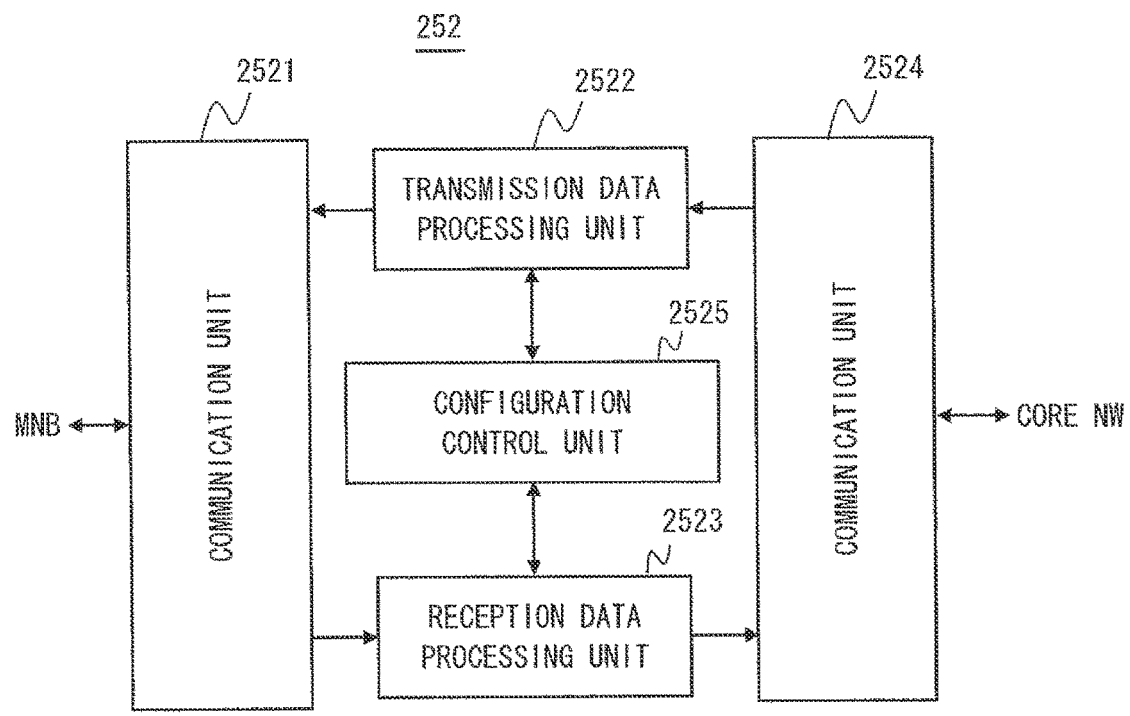
FIG. 8 is a block diagram showing a configuration example of an RNC in the mobile communication system according to the second illustrative embodiment of the present invention.

FIG. 8 is a block diagram showing a configuration example of the RNC 252. A communication unit 2521 transmits/receives user data and control data to/from the MNB 7. A transmission data processing unit 2522 acquires transmission data which is to be transmitted to the mobile station 8-1 and the MNB 7 from a communication unit 2524. Further, upon receiving the configuration information (CFG1) from a configuration control unit 2525, the transmission data processing unit 2522 broadcasts the configuration information (CFG1) to the MNB cell 12 via the communication unit 2521 and the MNB 7.

A reception data processing unit 2523 transfers the data received from the communication unit 2521 to the core network 150 via the communication unit 2524. Further, upon receiving the configuration information (CFG2) from the configuration control unit 2525, the reception data processing unit 2523 transmits the CFG2 to the destination HNB 2 via the communication unit 2524 and the core network 150.

The configuration control unit 2525 transmits the configuration information (CFG1) to the MNB 7 via the transmission data processing unit 2522 and the communication unit 2521. Further, the configuration control unit 2525 selects the suspicious base station, and transmits the configuration information (CFG2) to the HNB 2 which is selected as the suspicious base station.

Figure 9:
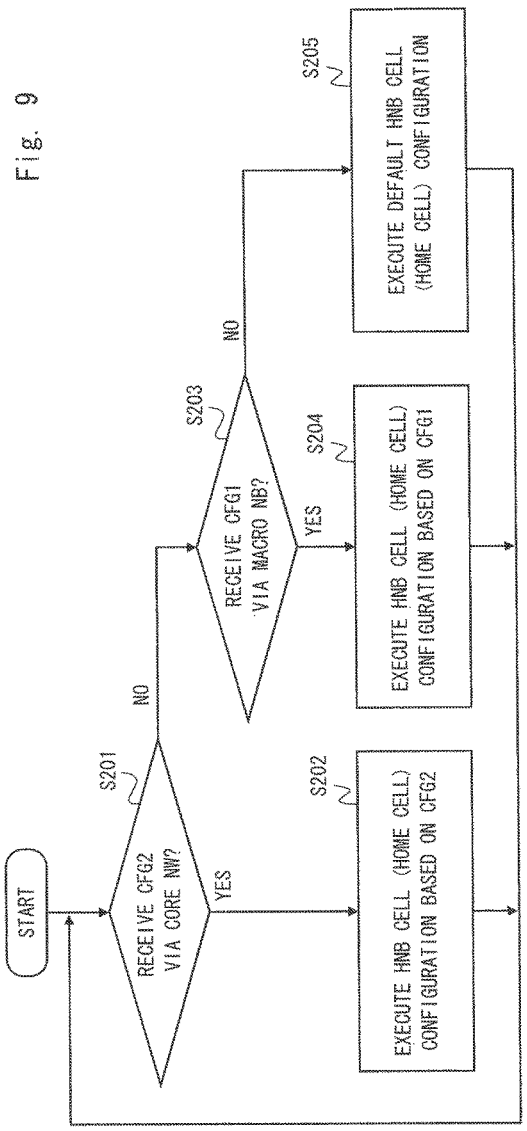
FIG. 9 is a flowchart showing a specific example of procedures for operating the home base station according to the second illustrative embodiment of the present invention.

In the following, operations of the HNB 2 and the RNC 252 will be described. FIG. 9 is a flowchart showing specific examples of an operation of the HNB 2 that has received the configuration information (CFG1 or CFG2). In step S201, the HNB 2 determines whether the configuration information (CFG2) is received via the access line 16 from the core network 150.

When the HNB 2 received the CFG2 (YES in S201), the HNB 2 performs the configuration of the home cell 11 according to the CFG2 (step S202). On the other hand, when the HNB 2 has not received the CFG2 (NO in S201), the HNB 2 determines whether the configuration information (CFG1) is received via the MNB 7 (step S203). Upon receiving the CFG1 (YES in S203), the HNB 2 performs the configuration of the home cell 11 according to the CFG1 (step S204).

When the HNB 2 has not received both of the CFG1 and CFG2 (NO in step S203), the HNB 2 performs the configuration of the home cell 11 according to the default setting (step S205). The default setting of the home cell 11 may be held by the HNB 1 when the product is shipped, for example, or may be notified from the core network 150 or the HNB-GW 151 to the HNB 1. Further, the HNB 1 itself may determine the default setting of the home cell 11.

In the example shown in FIG. 9, the HNB 2 preferentially uses the CFG2 notified from the core network 150 via the access line 16 when the HNB 2 has received both of the CFG1 and the CFG2. Even when the HNB 2 can receive the CFG1, the reliability of the CFG1 that is received may be low when the reception quality of the macrocell 12 is low. In such a case, according to the example shown in FIG. 9, it is possible to use the CFG2 with high reliability transmitted from the core network 150 via the access line 16 for the HNB 2. Further, such a case may occur in which the use of the CFG1 that is commonly used to all the HNBs 2 leads to excessive interference in the macrocell 12. In such a case, according to the example shown in FIG. 9, the CFG2 separately provided may be preferentially used for the HNB 2, thereby suppressing the interference in the macrocell 12.

Figure 10:
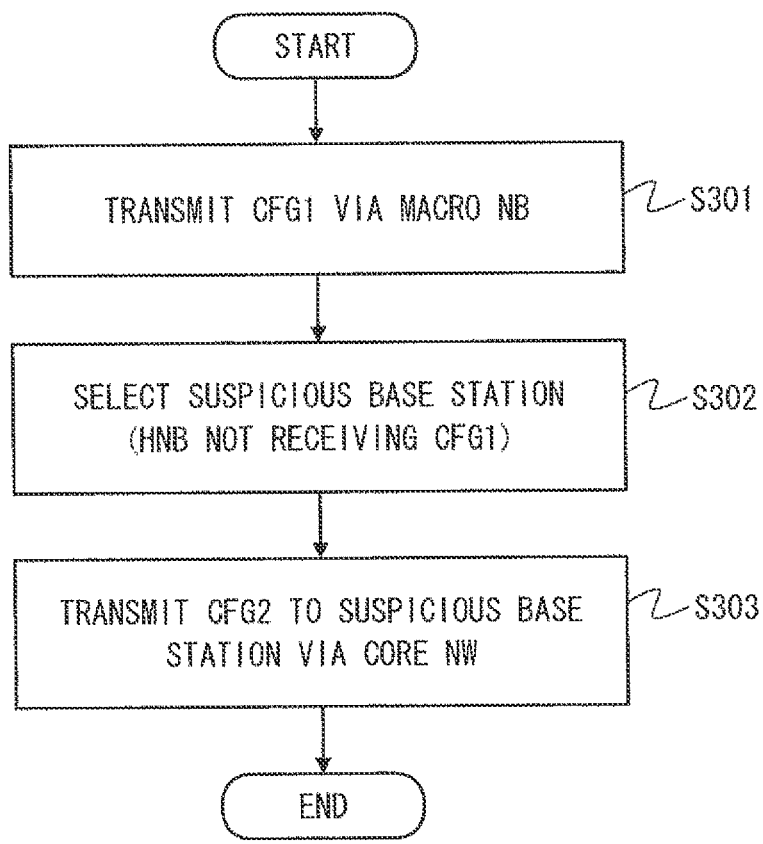
FIG. 10 is a flowchart showing a specific example of procedures for operating the RNC according to the second illustrative embodiment of the present invention.

FIG. 10 is a flowchart showing a specific example of an operation for transmitting the configuration information by the RNC 252. In step S301, the RNC 252 (configuration control unit 2525) transmits the configuration information (CFG1) via the MNB 7.

In step S302, the configuration control unit 2525 selects the suspicious base station. The selection of the suspicious base station may be performed by referring to the registration information indicating the attributes of the HNB 2. This registration information may be held by a management server (not shown) that manages the HNB 2 connected to the core network 150. Further, the attributes of the HNB 2 may be, as described in the first illustrative embodiment, information of the place where the HNB 2 is arranged, information indicating the reception quality of the radio signal from the macrocell 12 in the place where the HNB 2 is arranged, information indicating the interference level from the macrocell 12, or the combination thereof.

In step S303, the configuration control unit 2525 transmits the configuration information (CFG2) to the selected suspicious base station from the core network 150 via the access line 16.

As described above, the second illustrative embodiment, with the RNC 252 having the functions of the radio transmission controller 13 and the wired transmission controller 14, is able to transmits the configuration information (CFG1) via the macrocell 12, selects the suspicious base station, and transmits the configuration information (CFG2) to the suspicious base station via the core network 150.

Third Illustrative Embodiment

In a third illustrative embodiment, a specific example will be described for performing selection of a suspicious base station using, as an indicator, reception quality of a downlink signal from a macrocell in a position where a home base station is arranged. In the third illustrative embodiment, a case of UMTS/UTRAN will be described. A configuration of a mobile communication system according to the third illustrative embodiment may be similar to that of FIG. 6 according to the second illustrative embodiment.

Figure 11:
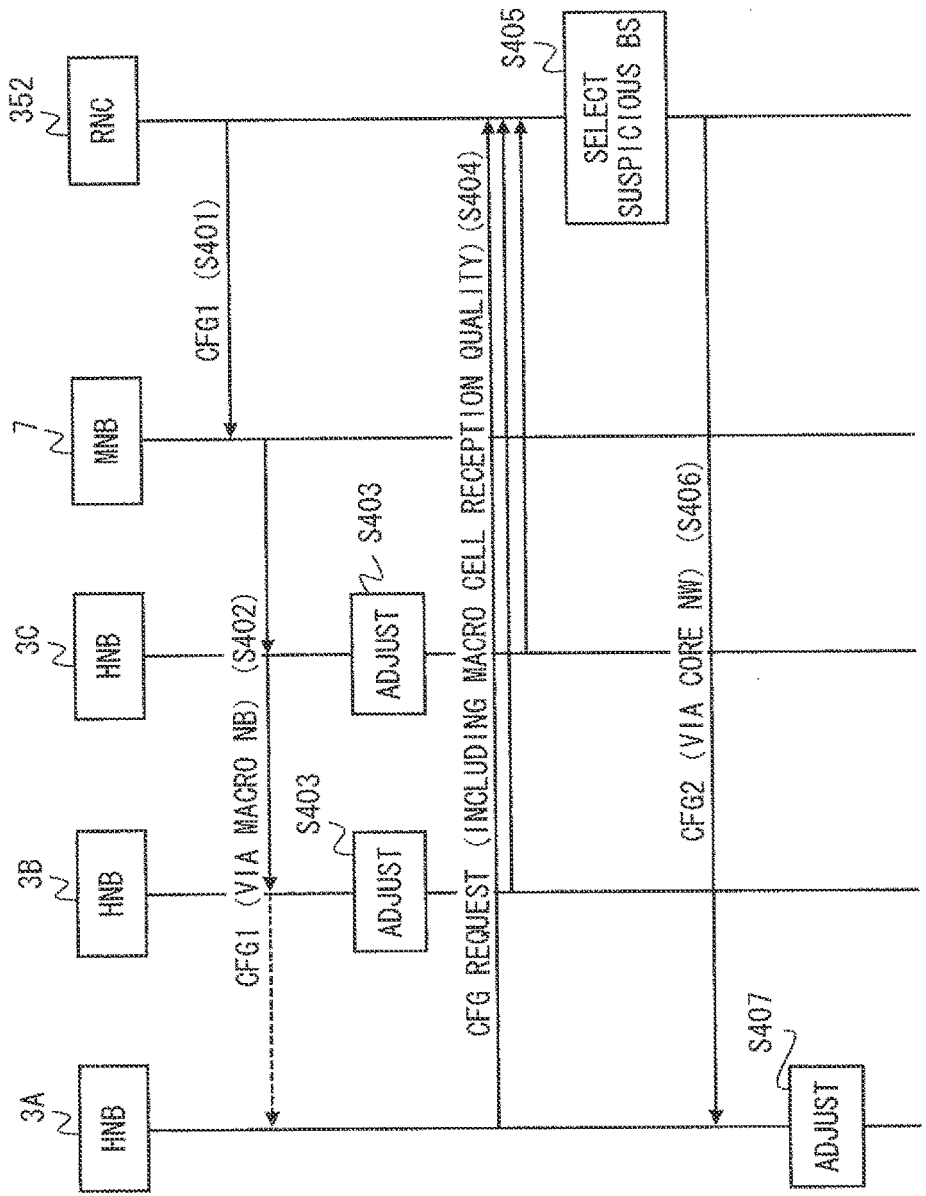
FIG. 11 is a sequence diagram showing procedures for supplying configuration information in a mobile communication system according to a third illustrative embodiment of the present invention.

FIG. 11 is a sequence diagram showing a specific example of procedures for supplying the configuration information to HNBs 3. The HNBs 3 are home base stations according to the third illustrative embodiment. An RNC 352 has functions of the radio transmission controller 13 and the wired transmission controller 14. FIG. 11 assumes a case in which three HNBs 3 (3A-3C) are arranged in the macrocell 12 or near the macrocell 12, as is similar to FIG. 2. Further, it is assumed in FIG. 11 that the HNBs 3B and 3C are arranged in positions that are capable of receiving the downlink radio channel transmitted from the MNB 7. On the other hand, it is assumed that the HNB 3A is arranged in a position capable of receiving the downlink radio channel transmitted from the MNB 7.

In steps S401 and S402, the RNC 352 broadcasts the configuration information (CFG1) to the macrocell 12 via the MNB 7. The HNBs 3B and 3C receive the configuration information (CFG1) and perform adjustment of its own home cells according to the CFG1 (step S403). On the other hand, the HNB 3A cannot receive the downlink radio channel transmitted from the MNB 7, and thus the adjustment of the cell configuration here is not performed.

In step S404, all the HNBs 3, i.e., the HNBs 3A-3C perform the transmission request (CFG request) of the configuration information (CFG2). While FIG. 11 shows a case in which the HNBs 3A-3C transmit the CFG request at the similar timing, the request transmission by each HNB 3 may be performed at different timings.

In step S405, the RNC 352 that received the CFG requests selects the suspicious base station. The RNC 352 may select the HNB as the suspicious base station when the reception quality of the macrocell 12 in the transmission source HNB 3 of the CFG request is below a predetermined level. In order to allow the RNC 352 to select the suspicious base station, information indicating reception quality of the macrocell 12 in the transmission source HNB 3 may be included in the CFG request. In the example shown in FIG. 11, the HNB 3A is selected as the suspicious base station.

In step S406, the RNC 352 transmits the configuration information (CFG 2) to the HNB 3A selected as the suspicious base station. Lastly, in step S407, the HNB 3A adjusts its own home cell according to the configuration information (CFG 2) received via the core network 150.

Figure 12:
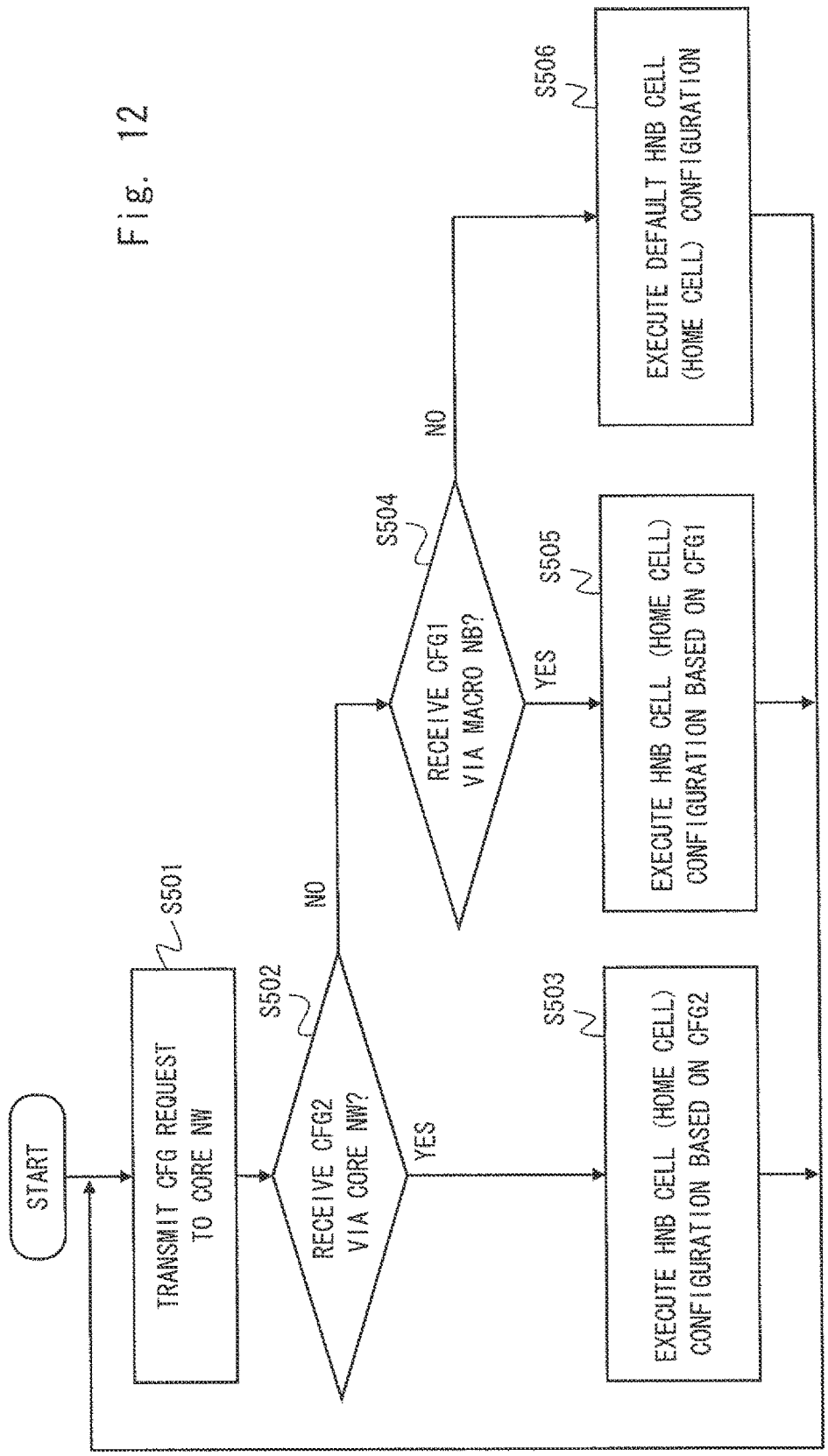
FIG. 12 is a flowchart showing a specific example of procedures for operating a home base station according to the third illustrative embodiment of the present invention.

FIG. 12 is a flowchart showing a specific example of the operation of the HNB 3. In step S501, the HNB 3 transmits the transmission request (CFG request) of the configuration information (CFG2) to the core network 150. In step S502, the HNB 3 determines whether the configuration information (CFG2) from the core network 150 is received via the access line 16. When it is determined in step S502 that the HNB 3 had not received the CFG2, the HNB 3 may repeat the operation of step S501 a predetermined number of times.

When the HNB 3 received the CFG2 (YES in S502), the HNB 3 performs the configuration of the home cell 11 according to the CFG2 (step S503). On the other hand, when the HNB 3 has not received the CFG2 (NO in S502), the HNB 3 determines whether the configuration information (CFG1) is received via the MNB 7 (step S504). When the HNB 3 received the CFG1 (YES in S504), the HNB 3 performs the configuration of the home cell 11 according to the CFG1 (step S505).

When the HNB 3 has not received both of the CFG1 and the CFG2 (NO in step S504), the HNB 3 performs the configuration of the home cell 11 according to the default setting (step S506).

Figure 13:
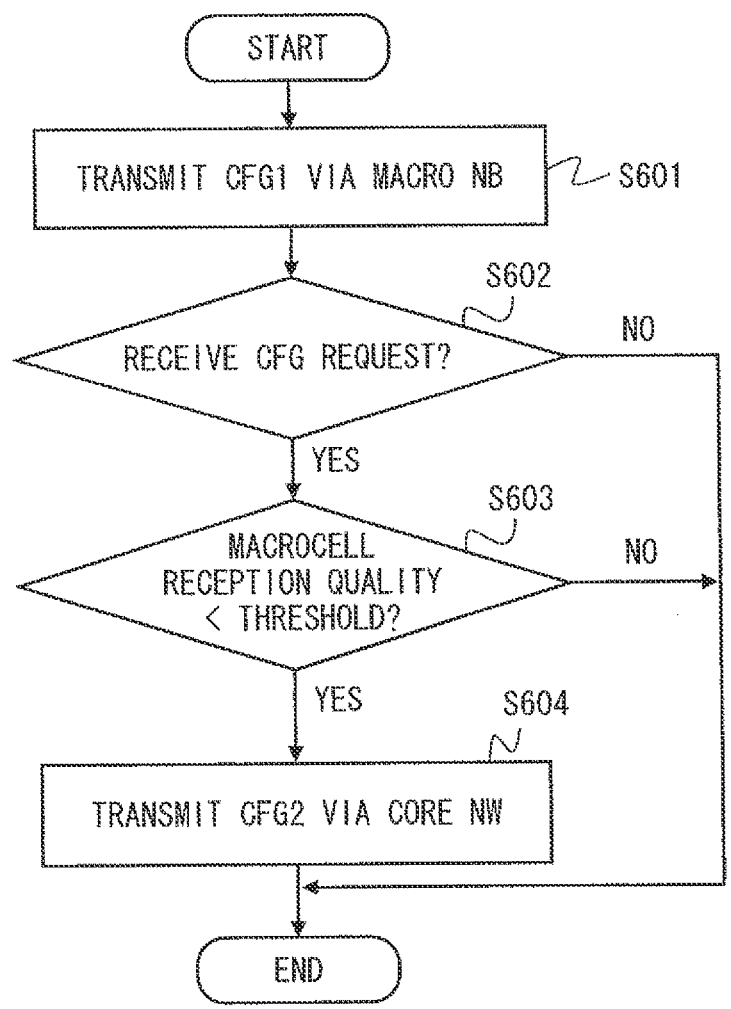
FIG. 13 is a flowchart showing a specific example of procedures for operating an RNC in the mobile communication system according to the third illustrative embodiment of the present invention.

FIG. 13 is a flowchart showing a specific example of an operation for selecting the suspicious base station by the RNC 352 and an operation for transmitting the configuration information (CFG2) to the suspicious base station. In step S601, the RNC 352 transmits the configuration information (CFG1) via the MNB 7. In step S602, the RNC 352 determines whether the CFG request from the HNB 3 is received. Upon receiving the CFG request, the RNC 352 compares the reception quality of the macrocell in the transmission source HNB 3 of the CFG request with a predetermined threshold value (step S603). When the reception quality of the macrocell in the transmission source HNB 3 is below the threshold value (YES in step S603), the RNC 352 determines the transmission source HNB 3 as the suspicious base station to transmit the configuration information (CFG2) to the HNB 3 (step S604).

Fourth Illustrative Embodiment

Also in a fourth illustrative embodiment, a specific example will be described for selecting a suspicious base station using, as an indicator, reception quality of a downlink signal from a macrocell in a position where a home base station is arranged. In the fourth illustrative embodiment, a case of UMTS/UTRAN will be described. A configuration of a mobile communication system according to the fourth illustrative embodiment may be similar to that in FIG. 6 according to the second illustrative embodiment.

Figure 14:
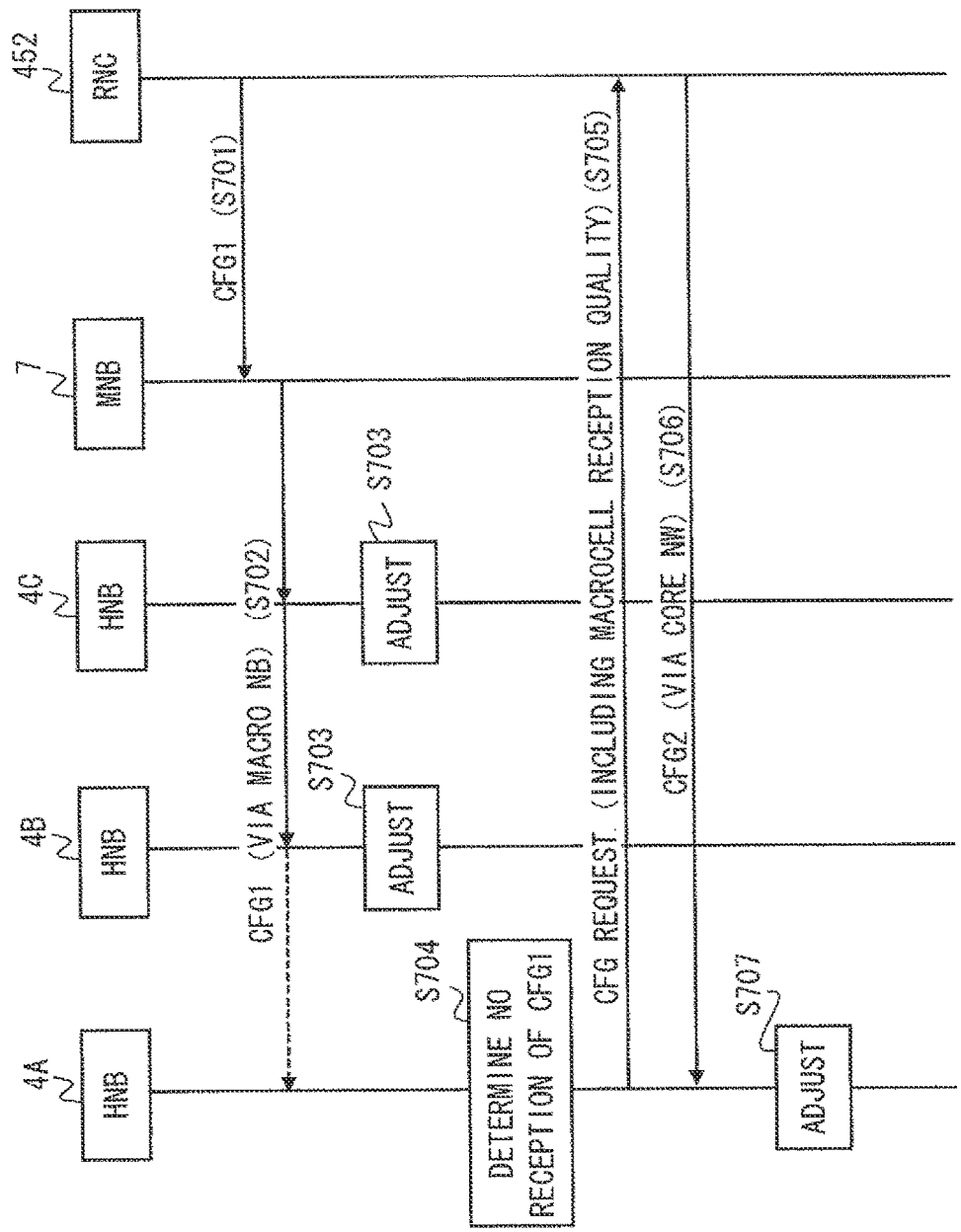
FIG. 14 is a sequence diagram showing procedures for supplying configuration information in a mobile communication system according to a fourth illustrative embodiment of the present invention.

FIG. 14 is a sequence diagram showing a specific example of procedures for supplying the configuration information to HNBs 4. The HNBs 4 are home base stations according to the fourth illustrative embodiment. An RNC 452 has functions of the radio transmission controller 13 and the wired transmission controller 14. FIG. 14 assumes a case in which three HNBs 4 (4A-4C) are arranged in the macrocell 12 or near the macrocell 12, as is similar to FIG. 2. Further, it is assumed in FIG. 14 that the HNBs 4B and 4C are arranged in positions capable of receiving the downlink radio channel transmitted from the MNB 7. On the other hand, it is assumed that the HNB 4A is arranged in a position that is difficult to receive the downlink radio channel transmitted from the MNB 7.

Described in the third illustrative embodiment above is the example in which all the HNBs 3 arranged around the macrocell 12 transmit the CFG requests including reception quality information of the macrocell 12 (see FIG. 11). Meanwhile, according to the fourth illustrative embodiment, only the HNB 4 which is determined that it cannot receive the CFG1 or determined that the reception quality of the macrocell 12 is insufficient transmits the CFG request. In the following, the difference between FIG. 14 and FIG. 11 will be mainly described.

Steps S701-S703 in FIG. 14 are similar to steps S401-S403 in FIG. 11. In step S704 in FIG. 14, the HNB 4A determines that it had not received the configuration information (CFG1) via the MNB 7. In step S705, the HNB 4A which has not received the CFG1 transmits the CFG request to the RNC 452. Note that the HNBs 3B and 3C which could normally receive the CFG1 do not transmit the CFG request.

In step S706, in response to the CFG request, the RNC 452 transmits the configuration information (CFG2) from the core network 150 to the HNB 4A via the access line 16. Lastly, in step S707, the HNB 4A adjusts its own home cell according to the configuration information (CFG2) received via the core network 150.

Figure 15:
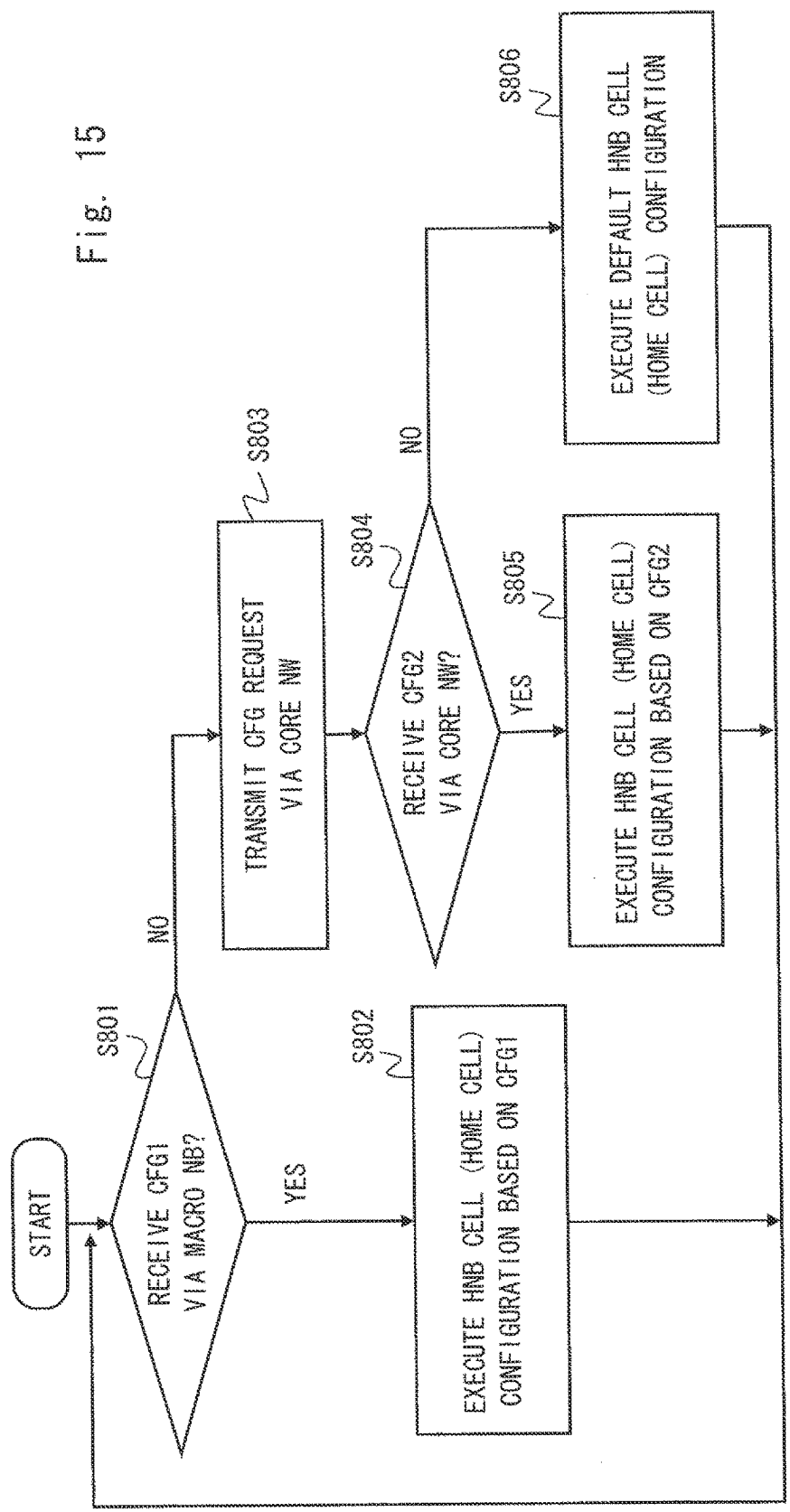
FIG. 15 is a flowchart showing a specific example of procedures for operating a home base station according to the fourth illustrative embodiment of the present invention.

FIG. 15 is a flowchart showing a specific example of an operation of the HNB 4. In step S801, the HNB 4 determines whether the configuration information (CFG1) has received via the MNB 7. In step S801, it may be determined that the HNB 4 has not received the CFG1 when the reception quality of the macrocell 12 is low and the accuracy of information received from the MNB 7 is considered to be low. For example, it may be determined that the HNB 4 has not received the CFG1 when CPICH of the macrocell 12 cannot be received, when a SIB (system information block) in which the configuration information (CFG1) is encoded cannot be decoded, or when the reception power (RSSI: Received Signal Strength Indicator) is equal to or smaller than a threshold.

When the HNB 4 received the CFG1 (YES in S801), the HNB 4 performs the configuration of the home cell 11 according to the CFG1 (step S802). On the other hand, when the HNB 4 has not received the CFG1 due to the reason that the reception quality of the macrocell 12 is insufficient, or the radio channel in which the CFG 1 is encoded cannot be decoded (NO in S801), the HNB 4 transmits the transmission request (CFG request) of the configuration information (CFG2) to the core network 150 (step S803). In step S804, the HNB 4 determines whether the configuration information (CFG2) is received via the core network 150. When it is determined in step S804 that the HNB 4 has not received the CFG2, the HNB 4 may repeat the operation of step S803 for a predetermined number of times.

When the HNB 4 received the CFG2 (YES in S804), the HNB 4 performs the configuration of the home cell 11 according to the CFG2 (step S805). On the other hand, when the HNB 4 has not received the CFG2 (NO in S804), the HNB 4 performs the configuration of the home cell 11 according to the default setting (step S806).

Figure 16:
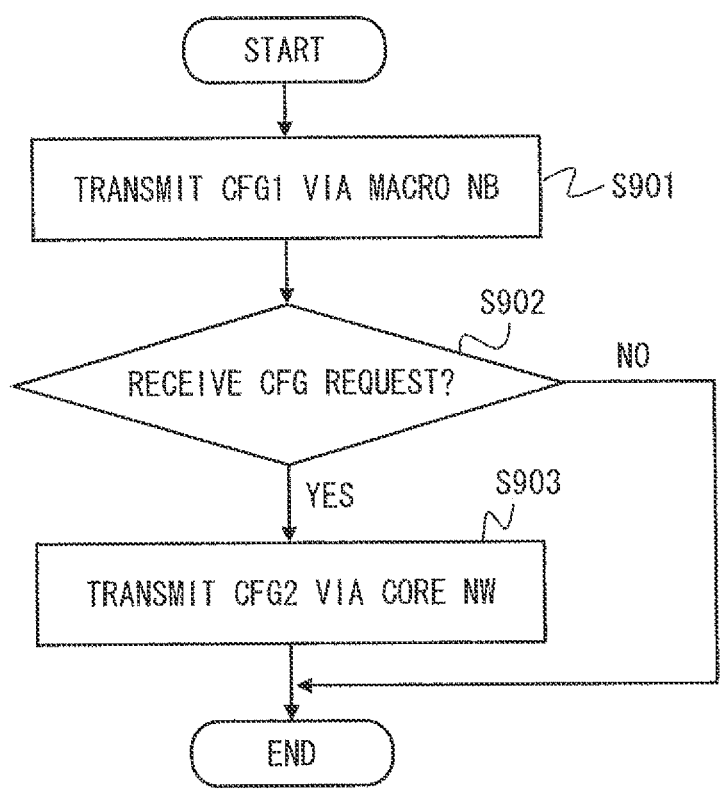
FIG. 16 is a flowchart showing a specific example of procedures for operating an RNC in the mobile communication system according to the fourth illustrative embodiment of the present invention.

FIG. 16 is a flowchart showing a specific example of an operation for selecting the suspicious base station by the RNC 452 and an operation for transmitting the configuration information (CFG2) to the suspicious base station. In step S901, the RNC 452 transmits the configuration information (CFG1) via the MNB 7. In step S902, the RNC 452 determines whether the CFG request from the HNB 4 is received. Upon receiving the CFG request (YES in step S902), the RNC 452 regards the transmission source HNB 3 of the CFG request as the suspicious base station to transmit the configuration information (CFG2) (step S903).

Fifth Illustrative Embodiment

Described in a fifth illustrative embodiment and the next sixth illustrative embodiment is a specific example in which the mobile station 8-2 connected to the macrocell 12 performs determination of the suspicious base station using the result of measuring the downlink signal from the home cell 11.

Figure 17:
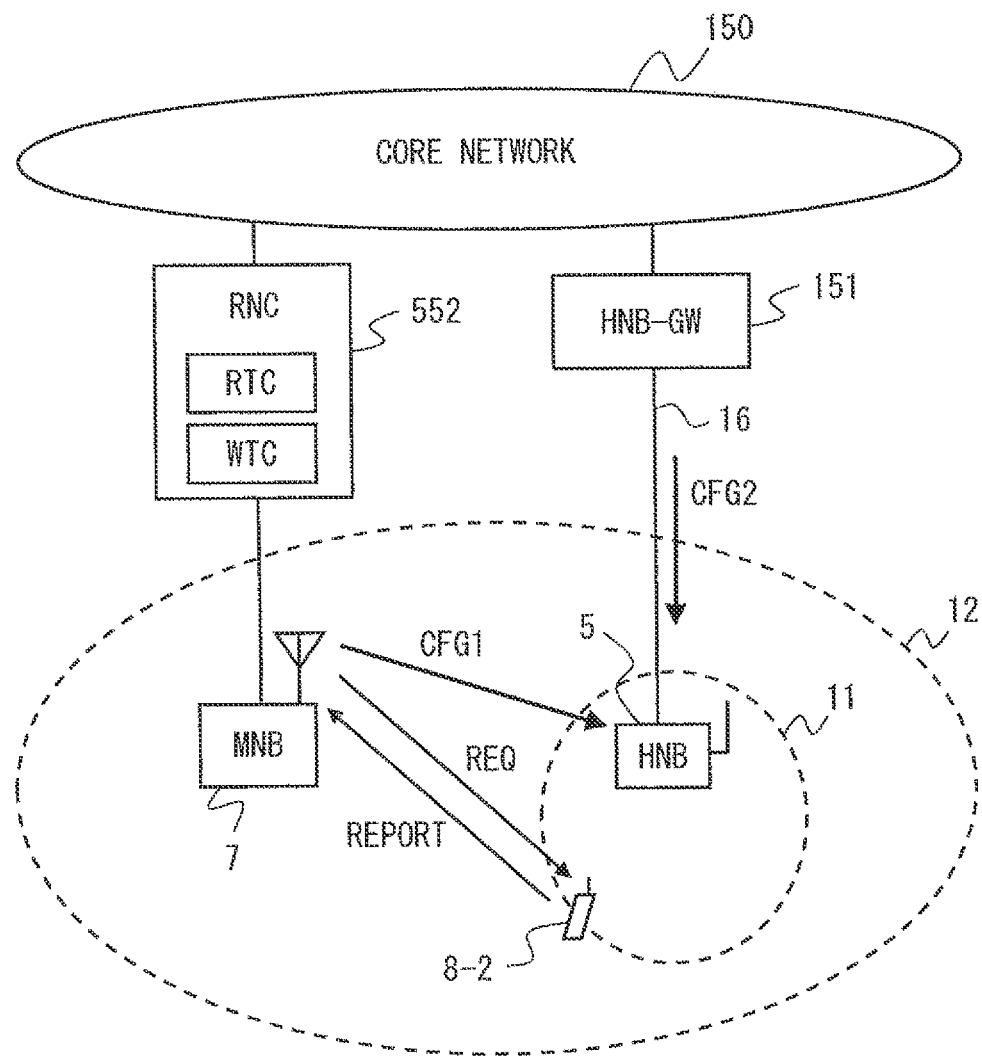
FIG. 17 is a diagram showing a network configuration example (a case of WCDMA/UTRAN) of a mobile communication system according to a fifth illustrative embodiment of the present invention.

FIG. 17 is a diagram showing a configuration example of a mobile communication system according to the fifth illustrative embodiment. An HNB 5 performs the setting of the radio parameter related to the home cell 11 according to the configuration information (CFG1) arriving via the MNB 7 or the configuration information (CFG2) arriving via the core network 150.

An RNC 552 requests the mobile station 8-2 connected to the macrocell 12 to measure the home cell 11. In response to the reception of the measurement request of the HNB cell from the RNC 552, the mobile station 8-2 measures the downlink signal from the home cell 11, and transmits the report including the measurement result to the RNC 552. The RNC 552 selects the suspicious base station by referring to the measurement report from the mobile station 8-2, and transmits the configuration information (CFG2) to the suspicious base station. Specifically, the HNB 5 which makes interference may be selected as the suspicious base station when the interference between the downlink signal of the HNB 5 and the downlink signal of the MNB 7 exceeds a predetermined level.

Figure 18:
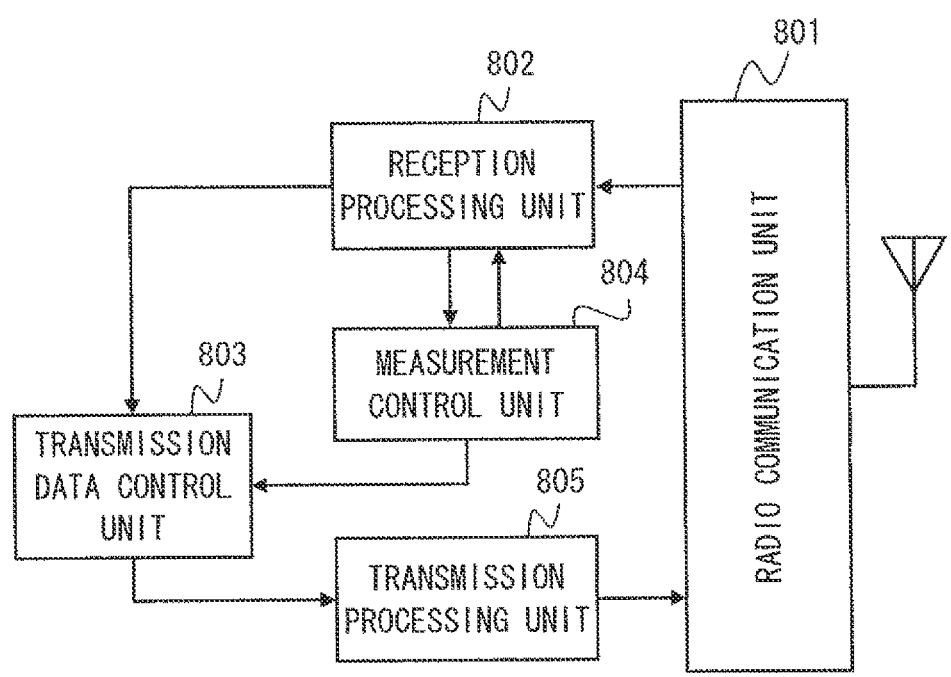
FIG. 18 is a block diagram showing a configuration example of a mobile station according to the fifth illustrative embodiment of the present invention.

FIG. 18 is a block diagram showing a configuration example of the mobile station 8-2 according to the fifth illustrative embodiment. FIG. 18 shows a part related to the measurement of the nearby home cell (HNB cell), and other components are omitted. In FIG. 18, a radio communication unit 801 performs radio communication with the MNB 7.

A reception processing unit 802 receives data from the MNB 7, and transfers the data to a measurement control unit 804 when the reception data is the measurement request of the HNB cell. Further, the reception processing unit 802 measures the home cell (MNB cell) 11 according to the measurement instruction from the measurement control unit 804, and reports the measurement result to the measurement control unit 804.

Upon receiving an HNB cell measurement request, the measurement control unit 804 instructs the reception processing unit 802 to measure the home cell (MNB cell) 11. Further, the measurement control unit 804 receives the measurement result of the home cell 11 from the reception processing unit 802, and instructs a transmission data control unit 803 to transmit the measurement result of the home cell 11 to the RNC 552.

The transmission data control unit 803 executes start or stop of the uplink data transmission according to the instruction from the measurement control unit 804. A transmission processing unit 805 generates an uplink signal, and transmits the uplink signal to the MNB 7 via the transmission radio communication unit 801.

Figure 19:
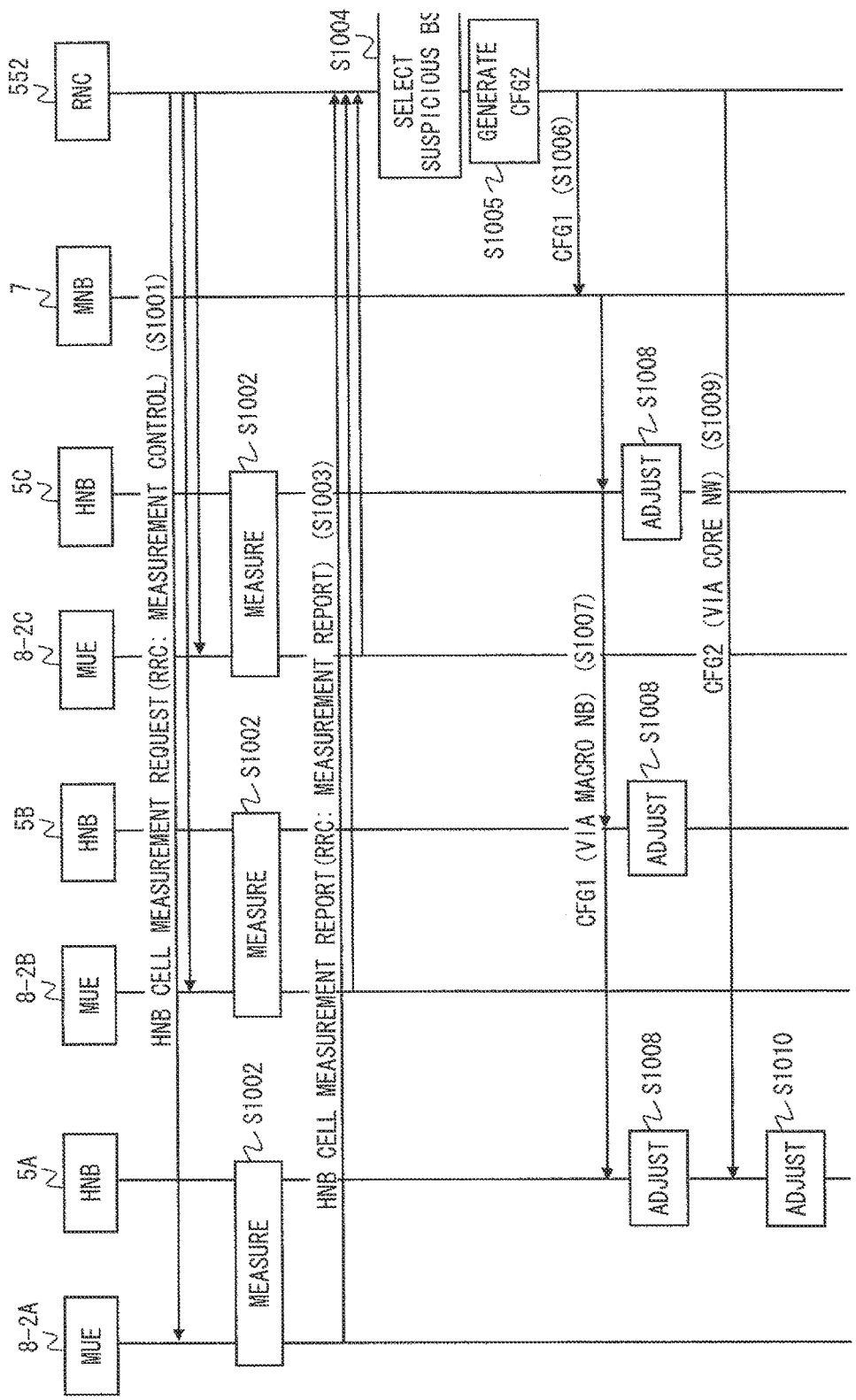
FIG. 19 is a sequence diagram showing procedures for supplying configuration information in the mobile communication system according to the fifth illustrative embodiment of the present invention.

FIG. 19 is a sequence diagram showing a specific example of procedures for supplying the configuration information to the HNB 5. FIG. 19 assumes a case in which three HNBs 5 (5A-5C) are arranged in the macrocell 12 or near the macrocell 12. Further, the mobile stations (MUE: Macro UE) 8-2A, 8-2B, and 8-2C shown in FIG. 19 are located near the HNBs 5A, 5B, and 5C, respectively.

In step S1001, the RNC 552 transmits the HNB cell measurement request to the mobile stations 8-2A to 8-2C. This measurement request may be transmitted using "Measurement Control" which is one of radio resource control (RRC) messages, for example. The HNB cell measurement request includes information specifying the measurement target HNB. The specification of the measurement target HNB may be performed using at least one of a radio frequency, a scrambling code, and a cell ID of the HNB cell. The HNB cell measurement request may include information indicating a period in which the transmission from the MNB 7 is stopped for the measurement of the HNB cell. Accordingly, it is possible to perform accurate measurement with eliminating influence of the downlink signal from the MNB 7.

The RNC 552 may select the mobile station 8-2 positioned near the HNB 5 which is to be measured to transmit the measurement request. A GPS (Global Positioning System) may be used to determine the positions of the HNB 5 and the mobile station 8-2. More specifically, a GPS (Global Positioning System) receiver may be provided in each of the HNB 5 and the mobile station 8-2, and the RNC 552 or a server (not shown) arranged in the core network 150 may collect positional information of the HNB 5 and the mobile station 8-2. Then, the mobile station 8-2 located near the HNB 5 which is to be measured may be selected by comparing the positional information of the HNB 5 with the positional information of the mobile station 8-2.

Referring back to FIG. 19, the description will be continued. In step S1002, the mobile stations 8-2A to 8-2C perform the measurement of the downlink signal from the HNB 5 specified by the HNB cell measurement request. In step S1003, the mobile stations 8-2A to 8-2C report the measurement result of the HNB cell to the RNC 552. This report may be performed, for example, using "Measurement Report", which is one of radio resource control (RRC) messages.

In step S1004, the RNC 552 refers to the measurement report of the HNB cell to perform selection of the suspicious base station. As described above, the RNC 552 may select the HNB 5 which makes interference as the suspicious base station when the interference between the downlink signal of the HNB 5 and the downlink signal of the MNB 7 exceeds a predetermined level.

In step S1005, the RNC 552 generates the configuration information (CFG2) based on the HNB cell measurement report. More specifically, when the interference from the home cell (HNB cell) 11 to the macrocell (MNB cell) 12 is too large, the RNC 552 may generate the CFG2 which includes the instruction to decrease the downlink transmission power of the HNB 5. In contrast, when the interference from the macrocell (MNB cell) 12 to the home cell (HNB cell) 11 is too large, the RNC 552 may generate the CFG2 which includes the instruction to allow the increase of the downlink transmission power of the HNB 5.

In steps S1006 and S1007, the RNC 552 broadcasts the configuration information (CFG1) to the macrocell 12 via the MNB 7. In step S1008, the HNBs 5A-5C receive the configuration information (CFG1) and perform adjustment of its own home cell according to this information.

In step S1009, the RNC 552 transmits the configuration information (CFG2) to the suspicious base station from the core network 150 via the access line 16. In the example shown in FIG. 19, the HNB 5A is selected as the suspicious base station. Lastly, in step S1010, the HNB 5A adjusts its own home cell according to the configuration information (CFG2) received via the core network 150.

Next, an operation of each of the RNC 552 and the mobile station 8-2 will be described according to the flowchart. Note that the operation of the HNB 5 may be similar to that of the HNB 2 (FIG. 9) described in the second illustrative embodiment.

Figure 20:
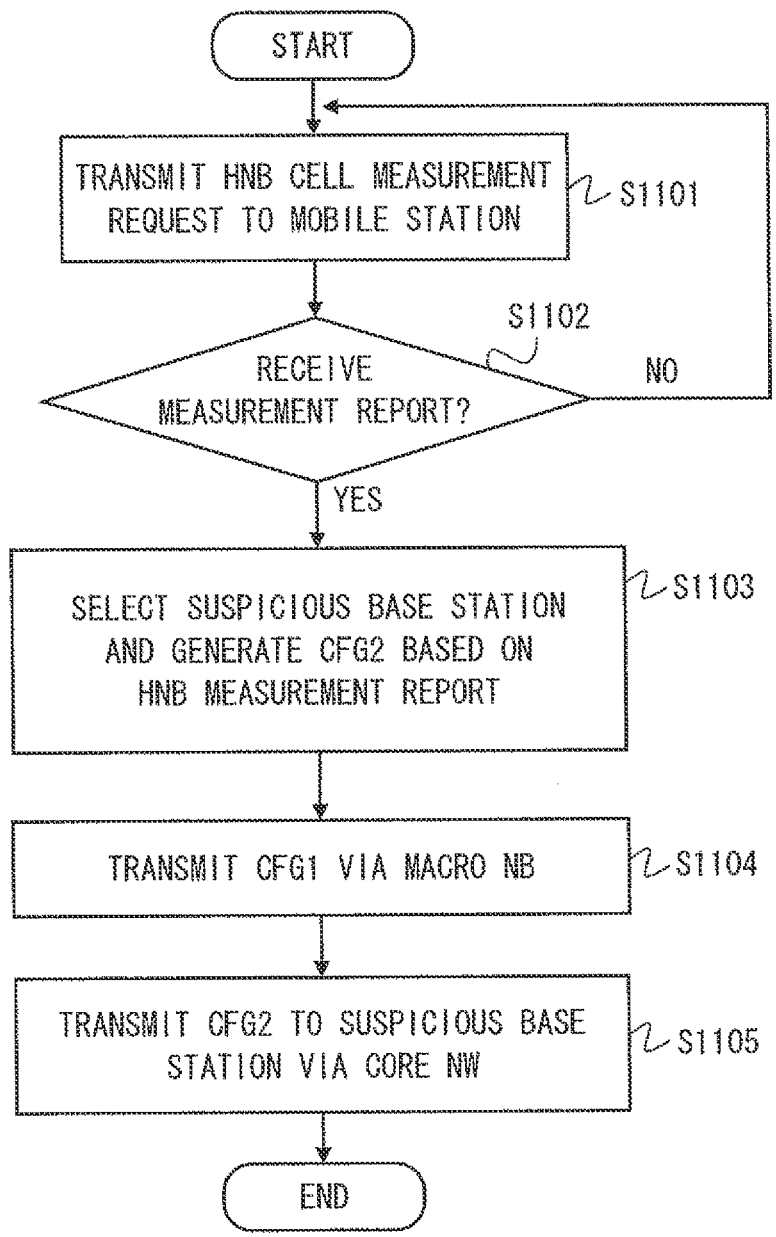
FIG. 20 is a flowchart showing a specific example of procedures for operating an RNC according to the fifth illustrative embodiment of the present invention.

FIG. 20 is a flowchart showing a specific example of the operation of the RNC 552. In step S1101, the RNC 552 transmits the HNB cell measurement request to the mobile station 8-2. In step S1102, it is determined whether the HNB cell measurement report is received from the mobile station 8-2. When the measurement report is received, the process goes to step S1103; if not, the process goes back to step S1101.

In step S1103, the RNC 552 selects the suspicious base station, and generates the configuration information (CFG2) based on the HNB measurement report. In step S1104, the RNC 552 radio-transmits the configuration information (CFG1) via the MNB 7. In step S1005, the RNC 552 transmits the configuration information (CFG2) to the suspicious base station via the core network 150.

Figure 21:
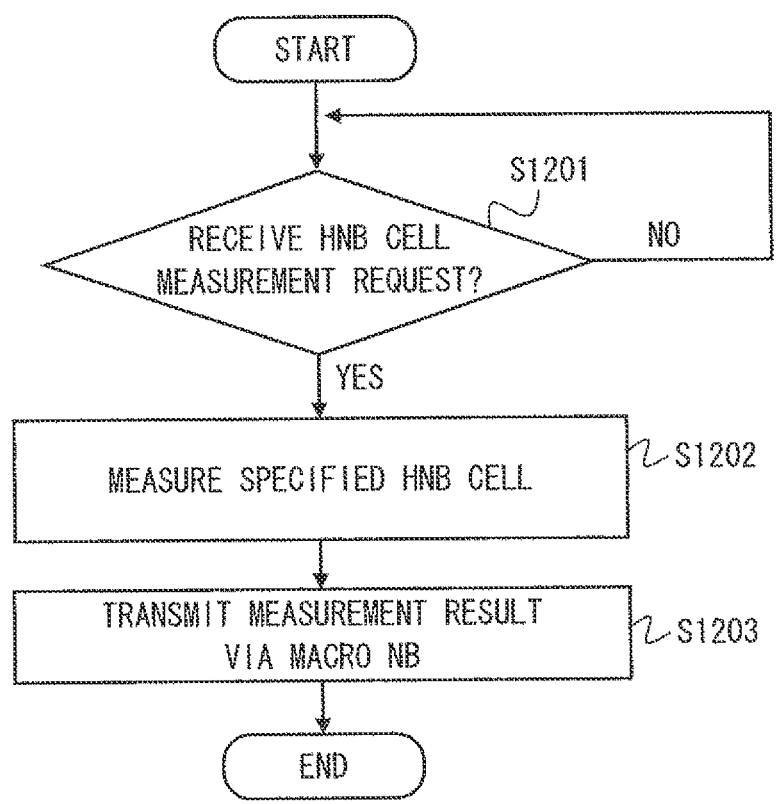
FIG. 21 is a flowchart showing a specific example of procedures for operating a mobile station according to the fifth illustrative embodiment of the present invention.

FIG. 21 is a flowchart showing a specific example of an operation of the mobile station 8-2. In step S1201, the mobile station 8-2 determines whether the HNB cell measurement request is received. Upon receiving the HNB cell measurement request (YES in step S1201), the mobile station 8-2 measures the home cell (HNB cell) 11 that is specified. In step S1203, the mobile station 8-2 transmits the measurement result of the home cell 11 to the RNC 552 via the MNB 7.

According to the fifth illustrative embodiment, the configuration information (CFG2) may be generated in consideration of the interference level between the home cell 11 and the macrocell 12. Specifically, the configuration information (CFG2) may be generated in consideration of the difference (or ratio) between the downlink reception power of the macrocell 12 and the downlink reception power of the home cell 11 in order to suppress the deterioration in communication quality due to the interference between the macro cell 12 and the home cell 11.

Sixth Illustrative Embodiment

Figure 22:
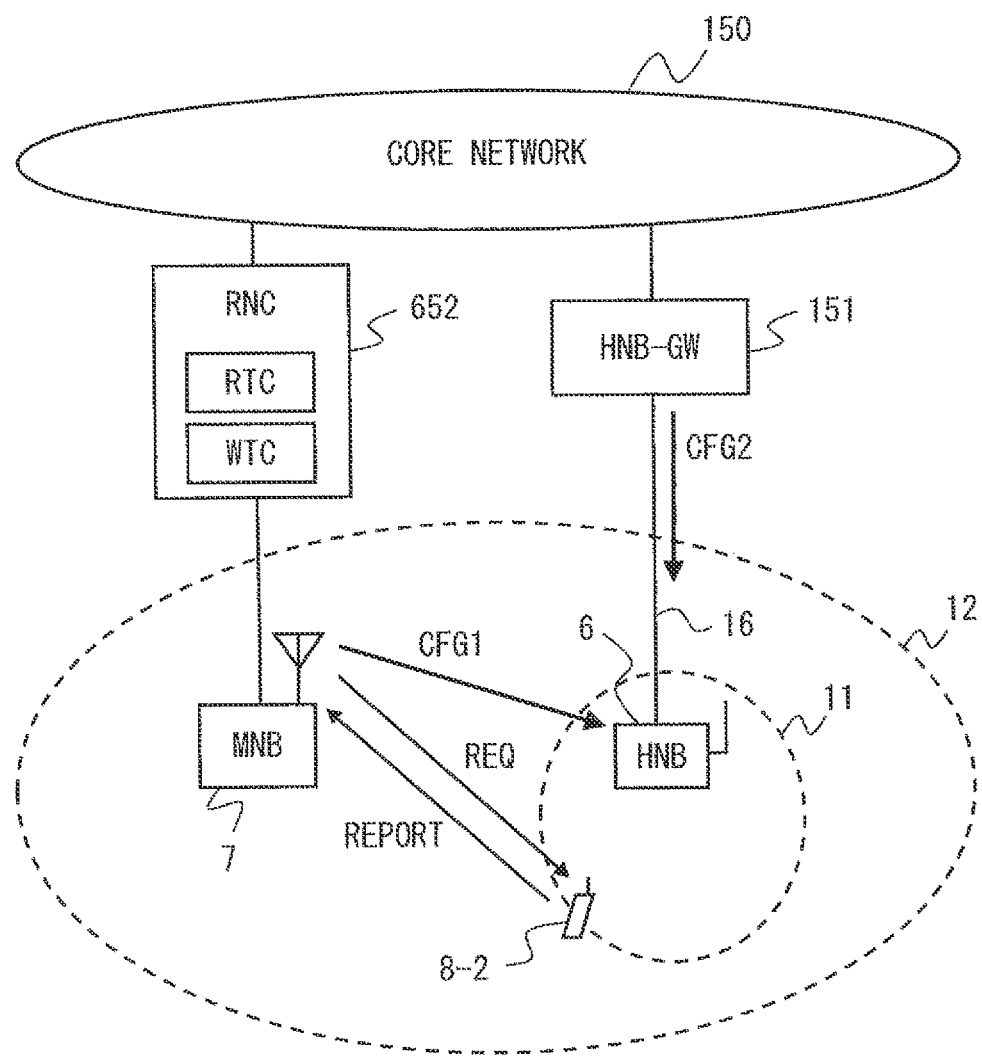
FIG. 22 is a diagram showing a network configuration example (a case of WCDMA/UTRAN) of a mobile communication system according to a sixth illustrative embodiment of the present invention.

Also in a sixth illustrative embodiment, a specific example will be described in which the mobile station 8-2 connected to the macrocell 12 determines the suspicious base station using the result of measurement of the downlink signal from the home cell 11. FIG. 22 is a diagram showing a configuration example of a mobile communication system according to the sixth illustrative embodiment. The configuration shown in FIG. 22 is similar to the system configuration example according to the fifth illustrative embodiment shown in FIG. 17.

Figure 23:
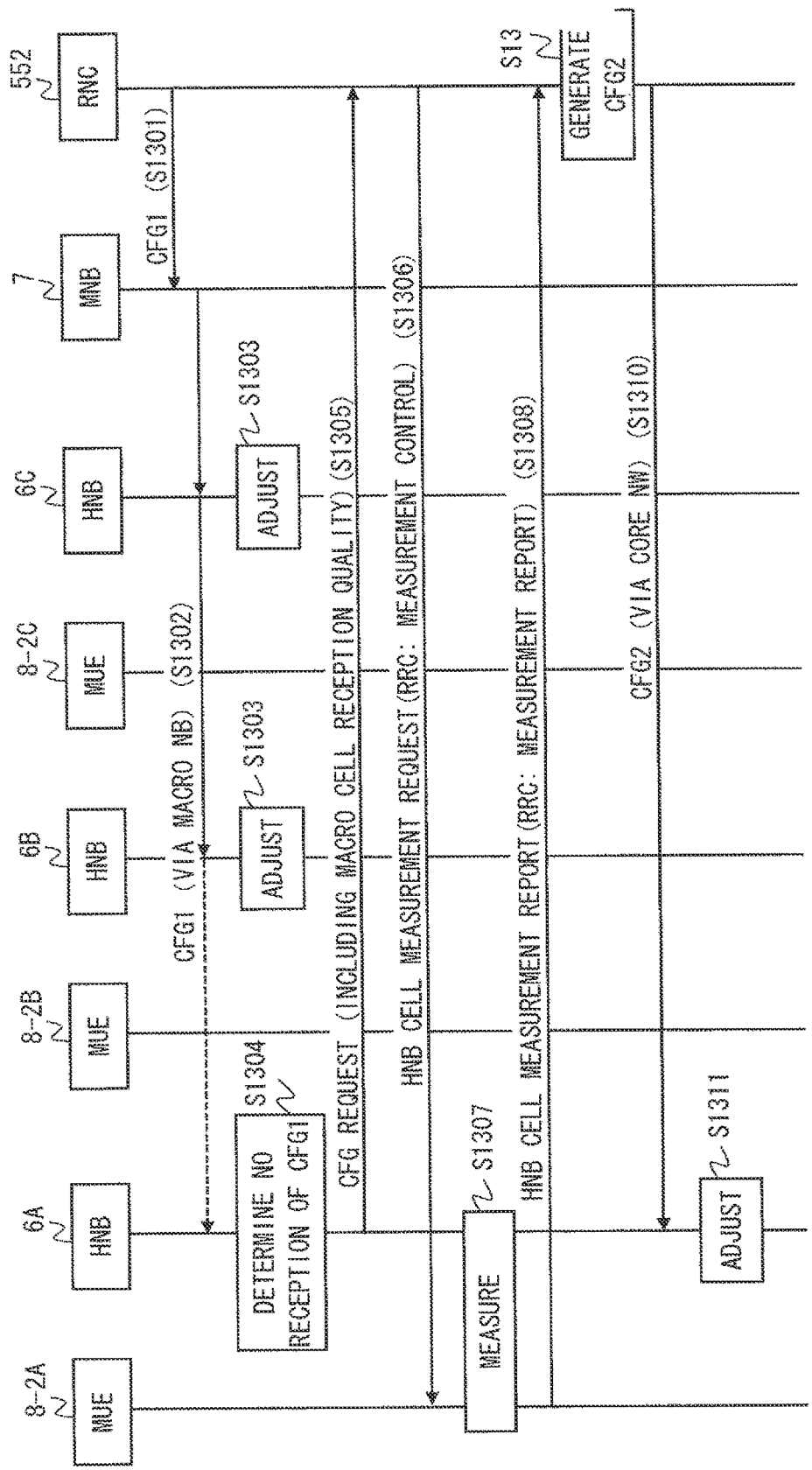
FIG. 23 is a sequence diagram showing procedures for supplying configuration information in the mobile communication system according to the sixth illustrative embodiment of the present invention.

FIG. 23 is a sequence diagram showing a specific example of procedures for supplying the configuration information to HNBs 6. FIG. 23 assumes a case in which three HNBs 6 (6A-6C) are arranged in the macrocell 12 or near the macrocell 12 as is similar to FIG. 19. Further, the mobile stations (MUE: Macro UE) 8-2A, 8-2B, and 8-2C shown in FIG. 23 are located near the HNBs 6A, 6B, and 6C, respectively.

Steps S1301-S1305 shown in FIG. 23 are similar to steps S701-S705 of the sequence diagram (FIG. 14) according to the third illustrative embodiment. In step S1306 shown in FIG. 23, an RNC 652 instructs the mobile station 8-2A to measure the downlink signal from the HNB 6A which is the transmission source of the CFG request. The mobile station 8-2A connected to the macrocell 12 performs measurement of the home cell 11 generated by the HNB 6A according to the HNB cell measurement request from the RNC 652 (step S1307). In step S1308, the mobile station 8-2A reports the measurement results of the HNB cell to the RNC 652.

In step S1309, the RNC 652 generates the configuration information (CFG2) based on the HNB cell measurement report. Specifically, when the interference from the home cell (HNB cell) 11 to the macrocell (MNB cell) 12 is too large, the RNC 652 may generate the CFG2 which includes the instruction to decrease the downlink transmission power of the HNB 6A. In contrast, when the interference from the macrocell (MNB cell) 12 to the home cell (HNB cell) 11 is too large, the RNC 652 may generate the CFG2 which includes the instruction to allow the increase of the downlink transmission power of the HNB 6A.

In step S1310, the configuration information (CFG2) is transmitted to the HNB 6A which is the suspicious base station via the core network 150. Lastly, in step S1311, the HNB 6A adjusts its own home cell according to the configuration information (CFG2) received via the core network 150.

Figure 24:
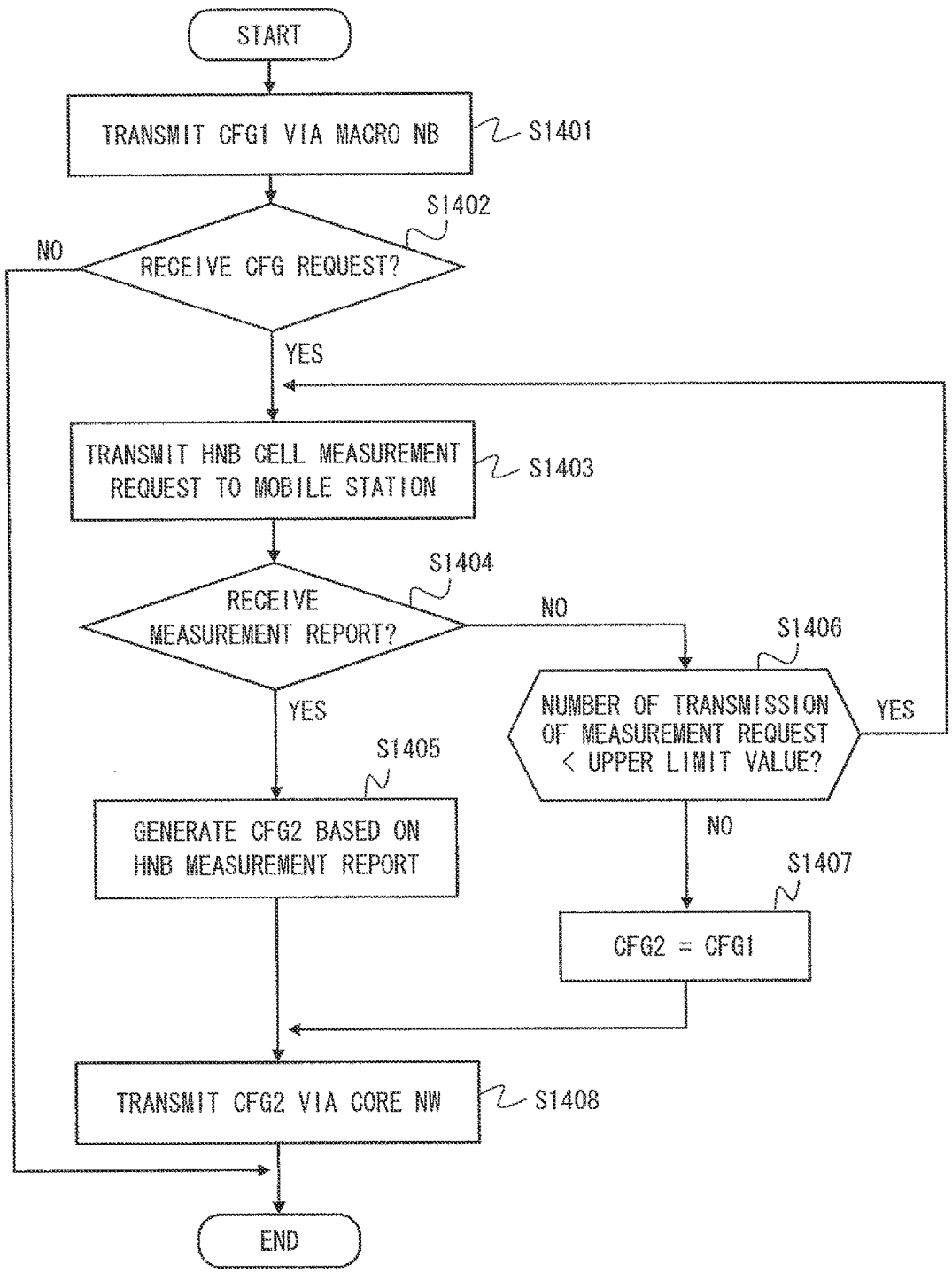
FIG. 24 is a flowchart showing a specific example of procedures for operating an RNC according to the sixth illustrative embodiment of the present invention.

Next, an operation of the RNC 652 will be described according to a flowchart shown in FIG. 24. Note that the operation of the HNB 6 may be similar to that of the HNB 4 (FIG. 15) described in the fourth illustrative embodiment. Further, the operation of the mobile station 8-2 may be similar to that of the mobile station 8-2 (FIG. 21) described in the fifth illustrative embodiment.

Steps S1401 and S1402 are similar to steps S901 and S902 shown in FIG. 16. In short, in step S1401, the RNC 652 transmits the configuration information (CFG1) via the MNB 7. In step S1402, the RNC 652 determines whether the CFG request from the HNB 6 is received.

Upon receiving the CFG request (YES in step S1402), the RNC 652 selects the mobile station 8-2 located near the transmission source HNB 6 of the CFG request, and transmits the HNB cell measurement request to the selected mobile station (step S1403). In step S1404, the RNC 652 determines whether the measurement report of the HNB cell from the mobile station 8-2 is received. Upon receiving the measurement report (YES in step S1404), the RNC 652 generates the configuration information (CFG2) based on the measurement report (step S1405).

On the other hand, when the RNC 652 has not received the measurement report (NO in step S1404), the RNC 652 goes back to step S1403 to repeat the transmission of the HNB cell measurement request until a predetermined maximum number of times (step S1406). Even when the RNC 652 has not received the measurement report even after a predetermined maximum number of times, the RNC 652 sets the CFG2 and the CFG1 so that they include the same setting contents (step S1407).

Lastly, in step S1408, the RNC 652 transmits the configuration information (CFG2) to the HNB 6A which is the suspicious base station via the core network 150.

Also in the sixth illustrative embodiment, the configuration information (CFG2) may be generated in consideration of the interference level of the macrocell 12 and the home cell 11. In summary, it is possible to generate the configuration information (CFG2) in consideration of the difference (or ratio) between the downlink reception power of the macrocell 12 and the downlink reception power of the home cell 11 in order to suppress deterioration in communication quality due to the interference between the macrocell 12 and the home cell 11.

Other Illustrative Embodiments

The second to sixth illustrative embodiments stated above may be combined as appropriate. The selection of the suspicious base station may be performed by combining selection procedures described in each illustrative embodiment.

In the second to sixth illustrative embodiments, the case of UMTS has been described in detail. However, the method of supplying the configuration information to the home base station described in these illustrative embodiments may be naturally applied to other systems including an EPS.

Processing performed in each apparatus (radio transmission controller 13, wired transmission controller 14, management server 153, home base stations 1-5, mobile station 8-2, and RNCs 152, 252, 352, 452, 552 and 652) described in the above first to sixth illustrative embodiments may be achieved using a computer system including an ASIC (Application Specific Integrated Circuit), a DSP (Digital Signal Processor), an MPU (Micro Processing Unit) or a CPU (Central Processing Unit), or combinations thereof. More specifically, it is possible to cause a computer system to execute a program including instructions regarding processing procedures of each apparatus described using the sequence diagrams or the flowcharts.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Furthermore, the present invention is not limited to the illustrative embodiments described above, but various changes may be made to the present invention within the spirit of the present invention already described.

This application claims the benefit of priority, and incorporates herein by reference in its entirety, the following Japanese Patent Application No. 2009-229471 filed on Oct. 1, 2009.

REFERENCE SIGNS LIST

1 HOME BASE STATION
2-6 HOME BASE STATION (HNB)
7 MACRO BASE STATION (M(e)NB)
8, 8-1, 8-2 MOBILE STATION
11 HOME CELL
12 MACROCELL
13 RADIO TRANSMISSION CONTROLLER
14 WIRED TRANSMISSION CONTROLLER
15 HIGHER-LEVEL NETWORK
16 ACCESS LINE
150 CORE NETWORK
151 H(e)NB GATEWAY (H(e)NB-GW)
152, 252, 352, 452, 552, 652 RNC
153 MANAGEMENT SERVER

The invention claimed is:

1. A mobile communication system comprising:
at least one first base station each connected to a higher-level network via an access line, each of the at least one first base station forming a first cell;
a second base station connected to the higher-level network and forming a second cell;
a first transmission control unit comprising at least one hardware processor configured to cause the second base station to transmit first configuration information regarding the first cell using a radio channel capable of being received by the at least one first base station; and
a second transmission control unit comprising at least one hardware processor configured to select, from the at least one first base station, a selected first base station, based on a radio setting for a first cell formed by the selected first base station being suspected of not being appropriately made in accordance with the first configuration information, and to transmit second configuration information, regarding the first cell formed by the selected first base station, selectively to the selected first base station via the access line, from the higher-level network.

2. The mobile communication system according to claim 1, wherein the second transmission control unit selects the selected first base station, from among the at least one first base station, based on the selected first base station being unable to receive at least a part of the first configuration information or based on the selected first base station having a reception quality of the second cell which does not satisfy a predetermined condition.

3. The mobile communication system according to claim 1, wherein the first configuration information and second configuration information each includes at least one of setting information of transmission power of the at least one first base station, and setting information of a radio resource used in the first cell.

4. The mobile communication system according to claim 1, wherein the first cell is a cell to which only a predetermined mobile station is allowed to connect.

5. The mobile communication system according to claim 1, wherein each of the at least one first base stations is configured to measure a reception quality of the second cell, and to transmit a message including a measurement result of the reception quality of the second cell to the second transmission control unit.

6. The mobile communication system according to claim 5, wherein the second transmission control unit selects the selected base station in consideration of the reception quality of the second cell in the at least one first base station obtained from the measurement result included in the message.

7. The mobile communication system according to claim 1, wherein each of the at least one first base station is configured to transmit a transmission request to the second transmission control unit.

8. The mobile communication system according to claim 7, wherein the second transmission control unit selects the selected base station in consideration of whether the transmission request is received.

9. The mobile communication system according to claim 7, wherein the each of the at least one first base station transmits the transmission request when at least a part of the first configuration information cannot be received, or when the reception quality of the second cell is insufficient.

10. The mobile communication system according to claim 7, wherein the transmission request comprises information regarding the first cell.

11. The mobile communication system according to claim 10, wherein the information regarding the first cell indicates at least one of a radio frequency used in the first cell and an identifier of the first cell.

12. The mobile communication system according to claim 1, wherein the second transmission control unit selects the selected base station in consideration of the reception quality of the first cell measured by a mobile station which belongs to the second cell.

13. The mobile communication system according to claim 12, wherein setting contents of the first cell specified by the second configuration information is determined based on the measurement result of the reception quality of the first cell measured by the mobile station.

14. The mobile communication system according to claim 12, wherein the second transmission control unit determines setting contents of the first cell notified by the second configuration information in a way that allows an interference level from the first cell in the mobile station below a predetermined level.

15. The mobile communication system according to claim 12, wherein the second transmission control is further configured to transmit the measurement request to require the measurement of the first cell to the mobile station via the second base station.

16. The mobile communication system according to claim 15, wherein the second transmission control unit compares positional information of at least one mobile station which belongs to the second cell with positional information of the at least one first base station to determine a mobile station to which the measurement request is transmitted.

17. A base station apparatus comprising:
a radio communication unit comprising at least one hardware processor configured to form a first cell and being capable of performing radio communication with a mobile station, and for receiving a radio signal from a second cell formed by another base station;
a higher-level network communication unit comprising at least one hardware processor configured to perform communication with a higher-level network via an access line; and
a configuration control unit comprising at least one hardware processor configured to acquire first configuration information regarding the first cell through a first path; to acquire second configuration information regarding the first cell through a second path; and to set the first cell based on at least one of the first configuration information and the second configuration information;
wherein:
the first path is a path to the radio communication unit via the second cell,
the second path is a path to the higher-level network communication unit via the higher-level network and the access line, and
the second configuration information is selectively transmitted from the higher-level network to the base station apparatus when a radio setting for the first cell is suspected of not being appropriately made in accordance with the first configuration information.

18. The base station apparatus according to claim 17, wherein the configuration control unit sets the first cell by using the configuration information acquired in the second path in preference to the configuration information acquired in the first path.

19. The base station apparatus according to claim 17, wherein the configuration control unit is further configured to transmit a transmission request to require transmission of the configuration information via the second path through the higher-level network communication unit.

20. The base station apparatus according to claim 19, wherein the first configuration control unit is configured to transmit the transmission request when at least a part of the first configuration information cannot be received by the first path or when reception quality of the second cell in the radio communication unit is insufficient.

21. The base station apparatus according to claim 19, wherein the transmission request comprises a measurement result of a reception quality of the second cell in the radio communication unit.

22. The base station apparatus according to claim 19, wherein the transmission request comprises information regarding the first cell.

23. The base station apparatus according to claim 22, wherein the information regarding the first cell indicates at least one of a radio frequency used in the first cell and an identifier of the first cell.

24. A method of supplying configuration information to at least one first base station each forming a first cell, the method comprising:
causing a second base station forming a second cell to transmit first configuration information regarding the first cell using a radio channel capable of being received by the at least one first base station;
selecting, from the at least one first base station, a selected first base station based on a radio setting for a first cell formed by the selected first base station being suspected of not being appropriately made in accordance with the first configuration information; and
selectively transmitting second configuration information, regarding the first cell formed by the selected first base station, to the selected first base station via an access line connecting between a higher-level network and the selected first base station.

25. The method according to claim 24, wherein said selecting comprises selecting, from among the at least one first base station, the selected first base station based on the selected first base station being unable to receive at least a part of the first configuration information or based on the selected first base station having a reception quality of the second cell which does not satisfy a predetermined condition.

26. A method of controlling a base station connected to a higher-level network via an access line, the method comprising:
acquiring first configuration information carried by a radio signal arriving from a cell formed by another base station;

acquiring second configuration information arriving via the higher-level network and the access line; and setting a first cell formed by the base station based on the first or second configuration information, wherein the second configuration information is selectively transmitted from the higher-level network to the base station when radio setting for the first cell is suspected of not being appropriately made in accordance with the first configuration information.

27. A non-transitory computer readable medium storing a program for causing a computer to perform control regarding a base station connected to a higher-level network via an access line, the control comprising:

acquiring first configuration information carried by a radio signal arriving from a cell formed by another base station;

acquiring second configuration information arriving via the higher-level network and the access line; and setting a first cell formed by the base station based on the first or second configuration information, wherein the second configuration information is selectively transmitted from the higher-level network to the base station when radio setting for the first cell is suspected of not being appropriately made in accordance with the first configuration information.

* * * * *